(12) United States Patent
Usa et al.

(10) Patent No.: US 12,198,869 B2
(45) Date of Patent: Jan. 14, 2025

(54) ELECTROLYTIC CAPACITOR AND MANUFACTURING METHOD THEREOF

(71) Applicant: Panasonic Intellectual Property Management Co., Ltd., Osaka (JP)

(72) Inventors: Daisuke Usa, Osaka (JP); Yosuke Serizawa, Kyoto (JP); Honami Nishino, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 104 days.

(21) Appl. No.: 17/762,904

(22) PCT Filed: Oct. 23, 2020

(86) PCT No.: PCT/JP2020/040009
§ 371 (c)(1),
(2) Date: Mar. 23, 2022

(87) PCT Pub. No.: WO2021/085350
PCT Pub. Date: May 6, 2021

(65) Prior Publication Data
US 2022/0351914 A1 Nov. 3, 2022

(30) Foreign Application Priority Data
Oct. 31, 2019 (JP) ................................ 2019-198172

(51) Int. Cl.
*H01G 9/048* (2006.01)
*H01G 9/00* (2006.01)
(Continued)

(52) U.S. Cl.
CPC ............ *H01G 9/048* (2013.01); *H01G 9/0029* (2013.01); *H01G 9/0032* (2013.01); *H01G 9/07* (2013.01); *H01G 9/15* (2013.01); *H01G 9/028* (2013.01)

(58) Field of Classification Search
None
See application file for complete search history.

(56) References Cited

U.S. PATENT DOCUMENTS 6,320,742 B1    11/2001  Wada et al.
2004/0233615 A1 11/2004  Sakai et al.
(Continued)

FOREIGN PATENT DOCUMENTS

CN    101536127 A    9/2009
JP    6-045206       2/1994
(Continued)

OTHER PUBLICATIONS

International Search Report of PCT application No. PCT/JP2020/040009 dated Dec. 22, 2020.
(Continued)

*Primary Examiner* — Eric W Thomas
(74) *Attorney, Agent, or Firm* — Rimon P.C.

(57) ABSTRACT

An electrolytic capacitor includes a capacitor element. The capacitor element includes an anode part, a cathode part, and an intermediate part. The anode part includes a first portion that is a part of an anode body having a porous region, and a first dielectric layer. The intermediate part includes a second portion of the anode body, a second dielectric layer, and a first insulating member containing a first resin component. The cathode part includes a third portion of the anode body, a third dielectric layer, a solid electrolyte layer covering at least a part of the third dielectric layer, and a cathode lead-out layer covering at least a part of the solid
(Continued)

electrolyte layer. The first resin component contains a curing product of a first reactive compound. At least a part of the first insulating member is disposed in pores of the porous region in the intermediate part.

26 Claims, 21 Drawing Sheets

(51) Int. Cl.
  *H01G 9/07* (2006.01)
  *H01G 9/15* (2006.01)
  *H01G 9/028* (2006.01)

(56) References Cited

U.S. PATENT DOCUMENTS

| | | | |
|---|---|---|---|
| 2005/0162814 A1* | 7/2005 | Maruko | H01G 9/055 361/504 |
| 2006/0098394 A1 | 5/2006 | Sakai et al. | |
| 2010/0103589 A1 | 4/2010 | Fukunaga et al. | |
| 2011/0026190 A1 | 2/2011 | Oohata | |
| 2016/0333131 A1* | 11/2016 | Kawai | C08F 290/067 |
| 2019/0287732 A1* | 9/2019 | Nagayama | H01G 9/26 |

FOREIGN PATENT DOCUMENTS

| | | | | |
|---|---|---|---|---|
| JP | 2000-243665 | | 9/2000 | |
| JP | 2006-156681 | | 6/2006 | |
| JP | 2012212600 A | * | 11/2012 | |
| JP | 2018-067572 | | 4/2018 | |
| WO | 2000/067267 | | 11/2000 | |
| WO | 2007/061005 | | 5/2007 | |
| WO | 2008/038584 | | 4/2008 | |
| WO | WO-2018123492 A1 | * | 7/2018 | ........ H01G 9/00 |

OTHER PUBLICATIONS

English Translation of Chinese Office Action dated Jul. 8, 2024 for the related Chinese Patent Application No. 202080073782.5.

* cited by examiner

ELECTROLYTIC CAPACITOR AND MANUFACTURING METHOD THEREOF

CROSS-REFERENCE TO RELATED APPLICATIONS

This application is a U.S. national stage application of the PCT International Application No. PCT/JP2020/040009 filed on Oct. 23, 2020, which claims the benefit of foreign priority of Japanese patent application No. 2019-198172 filed on Oct. 31, 2019, the contents all of which are incorporated herein by reference.

TECHNICAL FIELD

The present invention relates to an electrolytic capacitor and a method for manufacturing the same, and more particularly to an improvement in heat resistance reliability.

BACKGROUND

Electrolytic capacitors are mounted on various electronic devices because of their small equivalent series resistance (ESR) and excellent frequency characteristics. A capacitor element used in an electrolytic capacitor includes, as an anode body, a foil containing a valve metal such as titanium, tantalum, aluminum, or niobium. An anode part and a cathode part are defined in the anode body. A solid electrolyte layer and a cathode lead-out layer are formed on a surface of the anode body in the cathode part.

International Publication No. 2000-067267, International Publication No. 2007-061005, and International Publication No. 2008-038584 describe that an insulating material is disposed between the anode part and the cathode part in order to secure an insulation between the anode part and the cathode part.

SUMMARY

An electrolytic capacitor according to a first aspect of the present invention includes a capacitor element. The capacitor element includes an anode part, a cathode part, and an intermediate part interposed between the anode part and the cathode part. The anode part includes a first portion that is a part of an anode body having a porous region, and a first dielectric layer covering at least a part of the first portion. The intermediate part includes a second portion other than the first portion of the anode body, a second dielectric layer covering at least a part of the second portion, and a first insulating member containing a first resin component. The cathode part includes a third portion other than the first portion and the second portion of the anode body, a third dielectric layer covering at least a part of the third portion, a solid electrolyte layer covering at least a part of the third dielectric layer, and a cathode lead-out layer covering at least a part of the solid electrolyte layer. The first resin component contains a curing product of a first reactive compound. At least a part of the first insulating member is disposed in pores of the porous region in the intermediate part.

An electrolytic capacitor according to a second aspect of the present invention includes a capacitor element. The capacitor element includes an anode part, a cathode part, and an intermediate part interposed between the anode part and the cathode part. The anode part includes a first portion that is a part of an anode body having a porous region, a first dielectric layer covering at least a part of the first portion, and a third insulating member containing a third resin component. The intermediate part includes a second portion other than the first portion of the anode body, and a second dielectric layer covering at least a part of the second portion. The cathode part includes a third portion other than the first portion and the second portion of the anode body, a third dielectric layer covering at least a part of the third portion, a solid electrolyte layer covering at least a part of the third dielectric layer, and a cathode lead-out layer covering at least a part of the solid electrolyte layer. At least a part of the third insulating member is disposed in pores of the porous region in the anode part.

An method for manufacturing an electrolytic capacitor according to a third aspect of the present invention includes a preparation step, a dielectric layer forming step, a first application step, a curing step, and a cathode part forming step. The preparation step is preparing an anode body having a porous region. The dielectric layer forming step is forming a dielectric layer on at least a part of a surface of the anode body. The first application step is defining an anode region, a cathode region, and an intermediate region interposed between the anode region and the cathode region in the anode body, and then applying a first insulating material containing a first resin component to the intermediate region so that at least a part of the first insulating material is disposed in pores of the porous region in the intermediate region. The curing step is curing a first reactive compound contained in the first resin component. The cathode part forming step is forming a solid electrolyte layer covering at least a part of the dielectric layer in the cathode region and a cathode lead-out layer covering at least a part of the solid electrolyte layer.

An method for manufacturing an electrolytic capacitor according to a fourth aspect of the present invention includes a preparation step, a dielectric layer forming step, a third application step, a fixing step, and a cathode part forming step. The preparation step is preparing an anode body having a porous region. The dielectric layer forming step is forming a dielectric layer on at least a part of a surface of the anode body. The third application step is defining an anode region, a cathode region, and an intermediate region interposed between the anode region and the cathode region in the anode body, and then applying a third insulating material containing a third resin component to the anode region so that at least a part of the third insulating material is disposed in pores of the porous region in the anode region. The fixing step is fixing the third resin component. The cathode part forming step is forming a solid electrolyte layer covering at least a part of the dielectric layer in the cathode region and a cathode lead-out layer covering at least a part of the solid electrolyte layer.

According to the present invention, heat resistance reliability can be improved.

DESCRIPTION OF EMBODIMENTS

Figure 1:
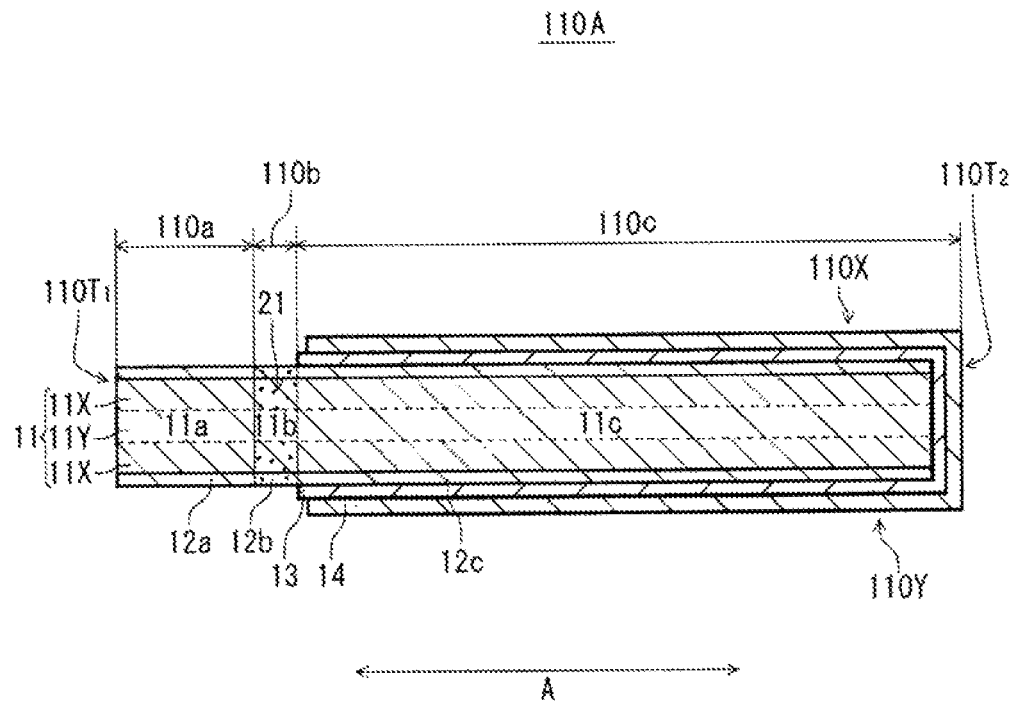
FIG. 1 is a sectional view schematically illustrating a capacitor element according to an exemplary embodiment of the present invention.

In order to increase electrostatic capacity, the surface of the anode body is usually roughened. Thus, oxygen entering from the anode part may reach the cathode part after passing through a porous region inside the anode body. The oxygen that has reached the cathode part oxidizes the solid electrolyte layer.

In the methods described in International Publication No. 2000-067267, International Publication No. 2007-061005, and International Publication No. 2008-038584, the movement of oxygen from the anode part to the cathode part cannot be sufficiently suppressed. Hence, the solid electrolyte layer is oxidized and deteriorated, and thus heat resistance reliability is likely to decrease.

[Electrolytic Capacitor]

An electrolytic capacitor according to the present exemplary embodiment includes a capacitor element that includes an anode part, a cathode part, and an intermediate part interposed between the anode part and the cathode part. The anode part includes a first portion that is a part of an anode body having a porous region, and a first dielectric layer covering at least a part of the first portion. The intermediate part includes a second portion other than the first portion of the anode body, and a second dielectric layer covering at least a part of the second portion. The cathode part includes a third portion other than the first portion and the second portion of the anode body, a third dielectric layer covering at least a part of the third portion, a solid electrolyte layer covering at least a part of the third dielectric layer, and a cathode lead-out layer covering at least a part of the solid electrolyte layer.

A first electrolytic capacitor according to the present exemplary embodiment includes an insulating member (first insulating member) disposed in pores of the porous region in the intermediate part. In other words, at least a part of voids of the porous region in the intermediate part is closed by the first insulating member. Hence, oxygen entering the electrolytic capacitor is suppressed to diffuse from the anode part to the cathode part. Thus, deterioration of the solid electrolyte layer is suppressed, and heat resistance reliability is improved. Furthermore, since the first insulating member contains a cured product of a reactive compound (first reactive compound), the heat resistance reliability is further enhanced. In addition, by the first insulating member, the anode part and the cathode part are insulated from each other.

A second electrolytic capacitor according to the present exemplary embodiment includes an insulating member (third insulating member) disposed in pores of the porous region in the anode part. In other words, at least a part of the voids of the porous region in the anode part is closed by the third insulating member. Hence, oxygen entering the electrolytic capacitor is suppressed to diffuse from the anode part to the cathode part. Thus, deterioration of the solid electrolyte layer is suppressed, and heat resistance reliability is improved. In addition, a strength of the anode part is also improved.

Here, a direction connecting the anode part, the intermediate part, and the cathode part is defined as a first direction. An end in the anode part of the capacitor element in the first direction is defined as a first end, and an end in the cathode part of the capacitor element in the first direction is defined as a second end. Each of boundaries among the anode part, the intermediate part, and the cathode part can be determined by a cross section (hereinafter, referred to as a first cross section) of the capacitor element at an arbitrary position along the first direction, which is obtained by cutting the capacitor element so as to cut its principal surface. The boundary between the anode part and the intermediate part is a straight line plane that passes through a point closest to a first end of the cured product of the first reactive compound disposed in the porous region inside the anode body, and that is parallel to a thickness direction of the capacitor element. The boundary between the intermediate part and the cathode part is a plane that passes through an end closest to a first end among ends of the solid electrolyte layers disposed on both principal surfaces of the capacitor element, and that is parallel to the thickness direction of the capacitor element. The intermediate part is a region between the boundary between the anode part and the intermediate part and the boundary between the intermediate part and the cathode part, the boundaries being determined as described above. The first direction is a direction connecting a midpoint of an end face in the anode part of the capacitor element and a midpoint of an end face in the cathode part of the capacitor element.

The porous region is a region having a large number of fine pores. A principal surface of the anode body is subjected to a roughening treatment. Thus, the porous region is formed in at least a part including the principal surface of the anode body. Each dielectric layer is formed along the surface of the anode body. That is, each dielectric layer is formed along inner walls of the pores of the porous region. Thus, it can be said that each dielectric layer also has a large number of fine pores. Hereinafter, the porous region includes a region having micropores in the anode body and a region having micropores in the dielectric layer.

A size of the intermediate part is not particularly limited. From the viewpoint of electrostatic capacity, it is preferable that the intermediate part is not excessively large. A ratio of a length of the intermediate part to a length of the cathode part in the first direction is preferably less than or equal to 0.2, and more preferably less than or equal to 0.15. From the viewpoint of insulation and blocking oxygen, the ratio of the length of the intermediate part to the length of the cathode part in the first direction is preferably more than or equal to 0.001, and more preferably more than or equal to 0.02. The ratio of the length of the intermediate part to the length of the cathode part in the first direction may specifically range from 0.001 to 0.2, inclusive.

A. First Electrolytic Capacitor

A first electrolytic capacitor according to the present exemplary embodiment includes a first insulating member disposed in pores of the porous region in the intermediate part. As a result, diffusion of oxygen entering the electrolytic capacitor from the anode part to the cathode part is suppressed.

The first insulating member contains a first resin component. The first resin component contains a curing product of a reactive compound.

FIG. 1 is a sectional view schematically illustrating the capacitor element according to the present exemplary embodiment. Note that, in order to clarify a shape or characteristics of each component part of an electrolytic capacitor, their sizes are relatively illustrated in the drawings, so that they are not necessarily illustrated with the same scale ratio.

FIG. 1 shows a cross section of capacitor element 110A, which is cut, so as to divide principal surfaces 110X and 110Y of the capacitor element, along first direction A connecting first end 110T1 on the anode part side and second end 110T2 on the cathode part side of the capacitor element. The same applies to FIG. 3 described later.

Capacitor element 110A has, for example, a sheet shape. Anode part 110a, intermediate part 110b, and cathode part 110c are aligned in this order in first direction A. Porous region 11X is disposed in a part including each of both principal surface sides of anode body 11. Core region 11Y is disposed between two porous regions 11X.

Anode part 110a includes first portion 11a that is a part of anode body 11, and first dielectric layer 12a covering at least a part of first portion 11a. Intermediate part 110b includes second portion 11b that is another part of anode body 11, second dielectric layer 12b covering at least a part of second portion 11b, and first insulating member 21. Cathode part 110c includes third portion 11c that is still another part of anode body 11, third dielectric layer 12c covering at least a part of third portion 11c, solid electrolyte layer 13 covering at least a part of third dielectric layer 12c, and cathode lead-out layer 14 covering at least a part of solid electrolyte layer 13.

At least a part of the voids of porous region 11X in intermediate part 110b is filled with first insulating member 21. As a result, the voids of porous region 11X are closed, and diffusion of oxygen from anode part 110a to cathode part 110c is suppressed.

From the viewpoint of further enhancing insulation between the anode part and the cathode part, the surface of the intermediate part may be covered with a second insulating member. The second insulating member contains a second resin component. The second resin component may contain a curing product of a reactive compound, or may contain a non-reactive resin.

From the viewpoint of suppressing the diffusion of oxygen more easily, a third insulating member may be disposed in pores of the porous region in the anode part. A strength of the anode part is also improved by the third insulating member. Thus, even when a plurality of the capacitor elements are laminated, damage to the capacitor elements is suppressed. The third insulating member contains a third resin component. The third resin component may contain a curing product of a reactive compound, or may contain a non-reactive resin.

The capacitor element may include both the second insulating member disposed in the intermediate part and the third insulating member disposed in the anode part.

Hereinafter, the capacitor element in the first electrolytic capacitor will be specifically described with reference to the drawings. However, the present exemplary embodiment is not limited thereto.

1a-Th Exemplary Embodiment

A capacitor element according to the present exemplary embodiment includes a first insulating member disposed in pores of the porous region in the intermediate part, and a second insulating member covering the surface of the intermediate part. As a result, the insulation between the anode part and the cathode part is further improved. The first insulating member may be in contact with the second insulating member.

Figure 2A:
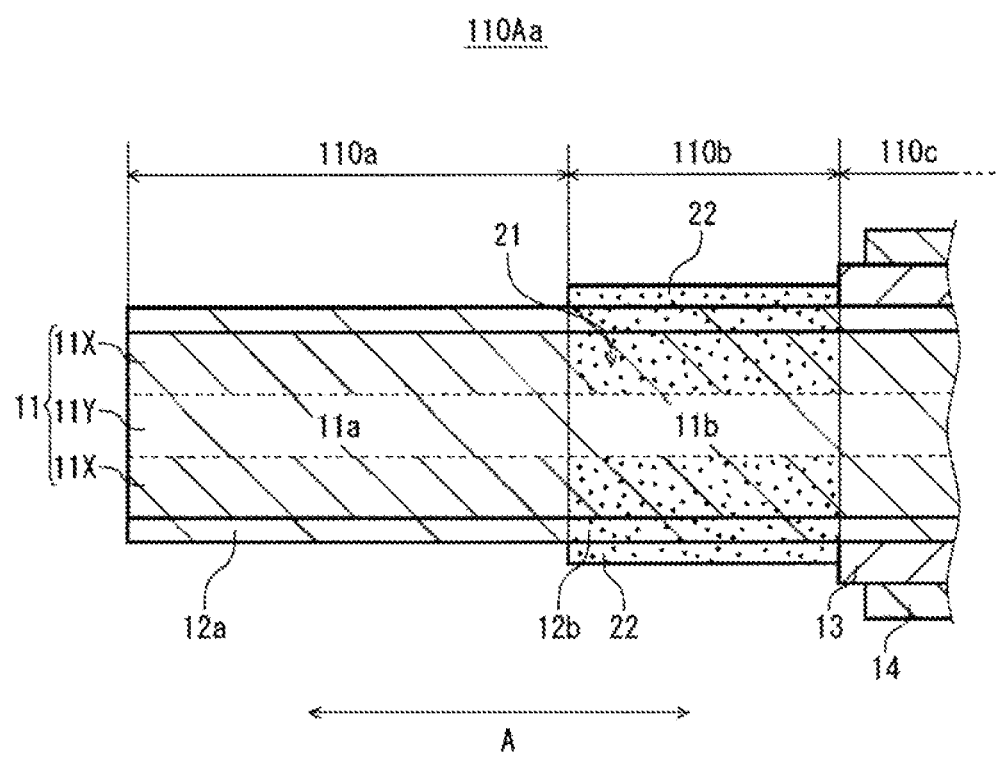
FIG. 2A is a sectional view schematically illustrating a main part of a capacitor element according to a 1a exemplary embodiment of the present invention.

FIG. 2A is a sectional view schematically illustrating a main part of capacitor element 110Aa according to the present exemplary embodiment. Intermediate part 110b includes first insulating member 21 and second insulating member 22. First insulating member 21 is disposed in pores of porous region 11X in intermediate part 110b. Second insulating member 22 covers the surface of intermediate part 110b. First insulating member 21 is in contact with second insulating member 22.

1b-th Exemplary Embodiment

A capacitor element according to the present exemplary embodiment includes a first insulating member disposed in pores of the porous region in the intermediate part, and a third insulating member disposed in pores of the porous region in the anode part. As a result, the diffusion of oxygen is further suppressed, and the strength of the anode part is improved. The first insulating member may be in contact with the third insulating member.

Figure 2B:
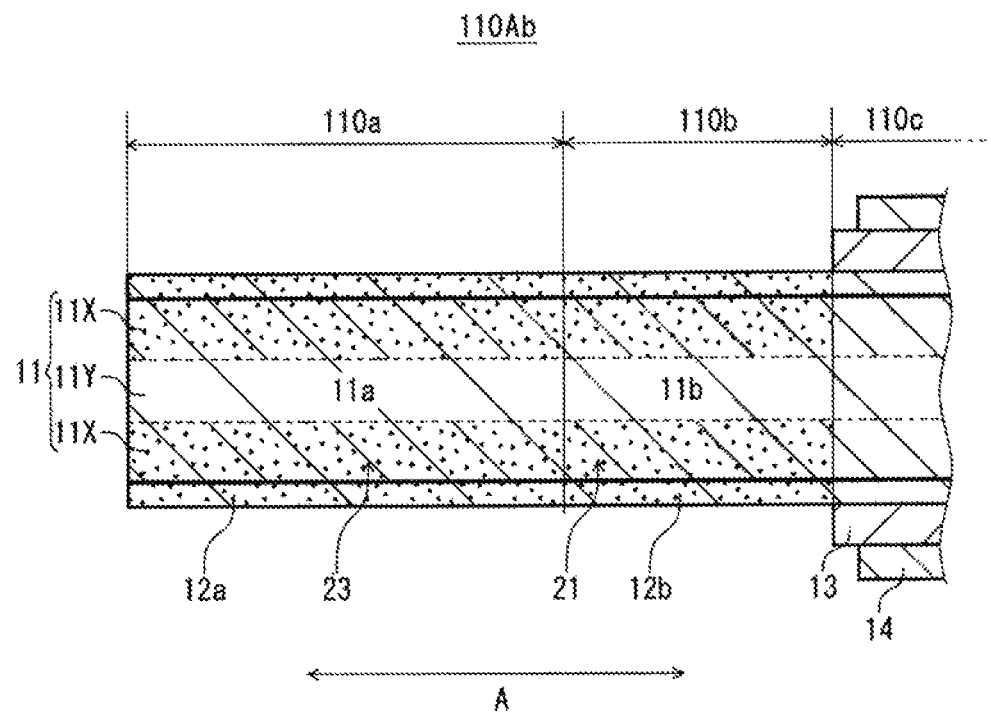
FIG. 2B is a sectional view schematically illustrating a main part of a capacitor element according to a 1b exemplary embodiment of the present invention.

FIG. 2B is a sectional view schematically illustrating a main part of capacitor element 110Ab according to the present exemplary embodiment. Intermediate part 110b includes first insulating member 21. First insulating member 21 is disposed in pores of porous region 11X in intermediate part 110b. Anode part 110a includes third insulating member 23. Third insulating member 23 is disposed in pores of porous region 11X in anode part 110a. First insulating member 21 is in contact with third insulating member 23.

1c-th Exemplary Embodiment

A capacitor element according to the present exemplary embodiment includes a first insulating member disposed in pores of the porous region in the intermediate part, a second insulating member covering the surface of the intermediate part, and a third insulating member disposed in pores of the porous region in the anode part. The first insulating member, the second insulating member, and the third insulating member may be in contact with each other.

Figure 2C:
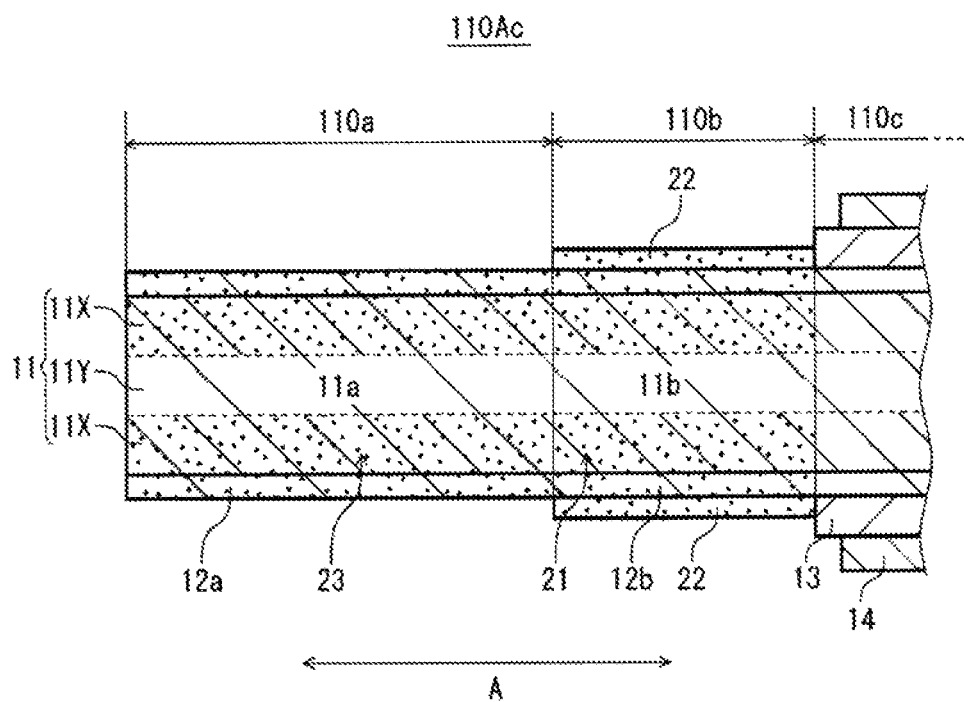
FIG. 2C is a sectional view schematically illustrating a main part of a capacitor element according to a 1c exemplary embodiment of the present invention.

FIG. 2C is a sectional view schematically illustrating a main part of capacitor element 110Ac according to the present exemplary embodiment. Intermediate part 110b includes first insulating member 21 and second insulating member 22. First insulating member 21 is disposed in pores of porous region 11X in intermediate part 110b. Second insulating member 22 covers the surface of intermediate part 110b. Anode part 110a includes third insulating member 23. Third insulating member 23 is disposed in pores of porous region 11X in anode part 110a. First insulating member 21, second insulating member 22, and third insulating member 23 are in contact with each other.

B. Second Electrolytic Capacitor

A second electrolytic capacitor according to the present exemplary embodiment includes a third insulating member disposed in pores of the porous region in the anode part. As a result, diffusion of oxygen entering the electrolytic capacitor from the anode part to the cathode part is suppressed.

The third insulating member contains a third resin component. The third resin component may contain a curing product of a reactive compound, or may contain a non-reactive resin.

Figure 3:
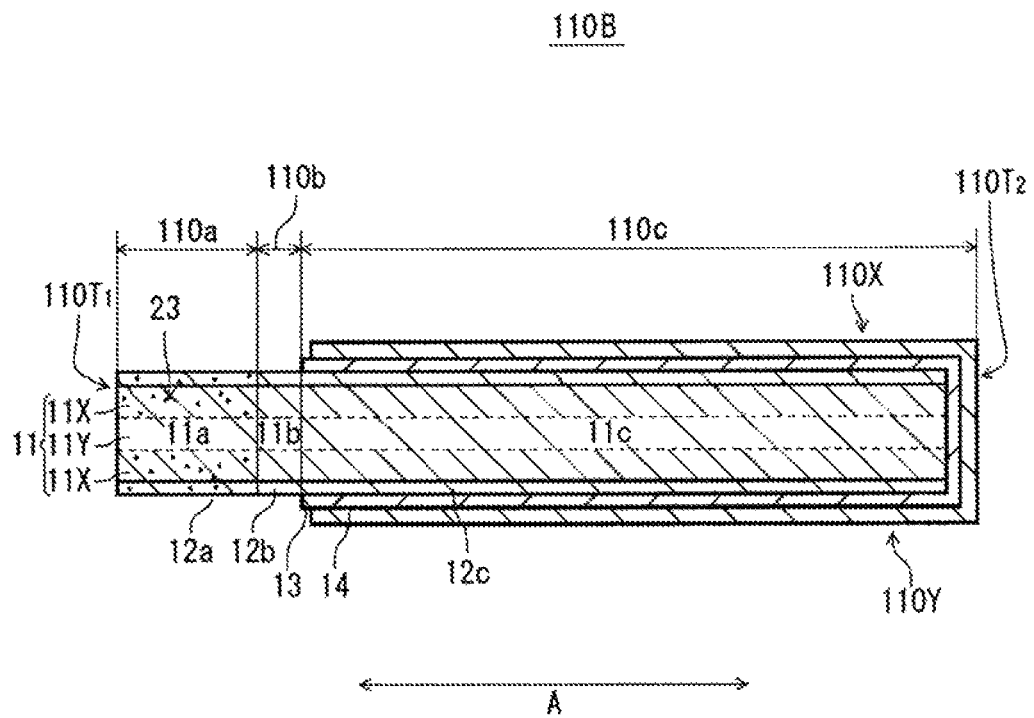
FIG. 3 is a sectional view schematically illustrating a capacitor element according to another exemplary embodiment of the present invention

FIG. 3 is a sectional view schematically illustrating the capacitor element according to the present exemplary embodiment. Capacitor element 110B in FIG. 3 has the same configuration as that of capacitor element 110A in FIG. 1 except that at least a part of the voids of porous region 11X in anode part 110a is filled with third insulating member 23, in place of intermediate part 110b.

From the viewpoint of enhancing the insulation between the anode part and the cathode part, the surface of the intermediate part may be covered with a second insulating member. The second insulating member contains a second resin component. The second resin component may contain a curing product of a reactive compound, or may contain a non-reactive resin.

From the viewpoint of suppressing the diffusion of oxygen more easily, a fourth insulating member may be disposed in pores of the porous region in the intermediate part. As a result, the insulation between the anode part and the cathode part is also enhanced. The fourth insulating member contains a fourth resin component. The fourth resin component may contain a curing product of a reactive compound, or may contain a non-reactive resin.

The capacitor element may include both the second insulating member and the fourth insulating member that are disposed in the intermediate part.

Hereinafter, the capacitor element in the second electrolytic capacitor will be specifically described with reference to the drawings. However, the present exemplary embodiment is not limited thereto.

2a-th Exemplary Embodiment

A capacitor element according to the present exemplary embodiment includes a third insulating member disposed in pores of the porous region in the anode part, and a second insulating member covering the surface of the intermediate part. As a result, the insulation between the anode part and the cathode part is improved.

Figure 4A:
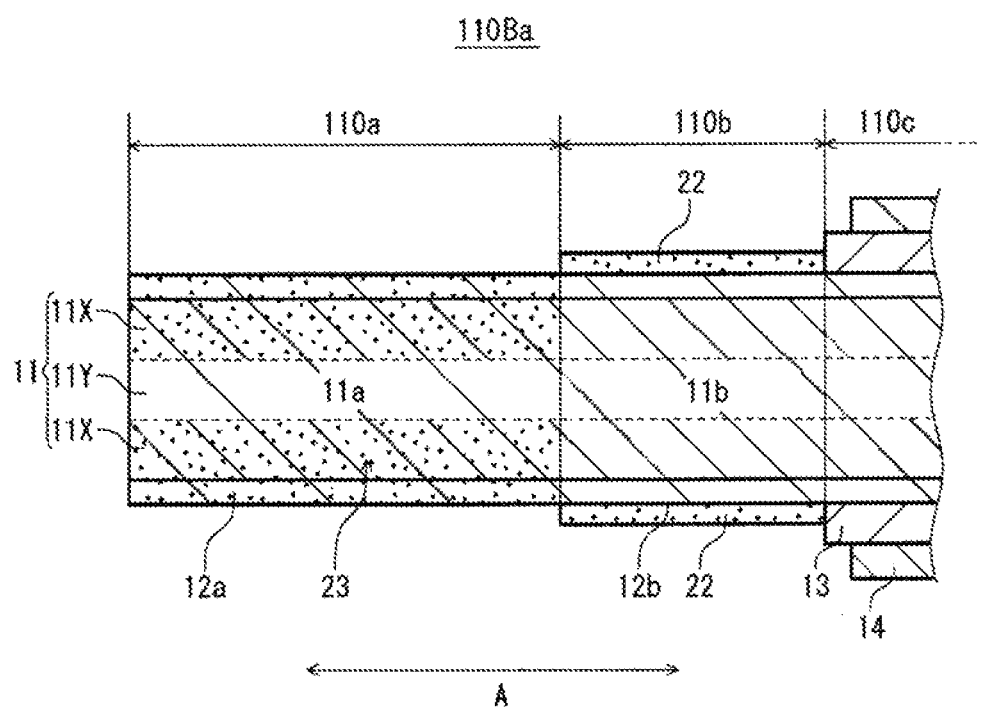
FIG. 4A is a sectional view schematically illustrating a main part of a capacitor element according to a 2a exemplary embodiment of the present invention.

FIG. 4A is a sectional view schematically illustrating a main part of capacitor element 110Ba according to the present exemplary embodiment. Anode part 110a includes third insulating member 23. Third insulating member 23 is disposed in pores of porous region 11X in anode part 110a. Intermediate part 110b includes second insulating member 22. Second insulating member 22 covers the surface of intermediate part 110b.

2b-th Exemplary Embodiment

A capacitor element according to the present exemplary embodiment includes a third insulating member disposed in pores of the porous region in the anode part, and a fourth insulating member disposed in pores of the porous region in the intermediate part. As a result, the diffusion of oxygen is further suppressed. The third insulating member may be in contact with the fourth insulating member.

Figure 4B:
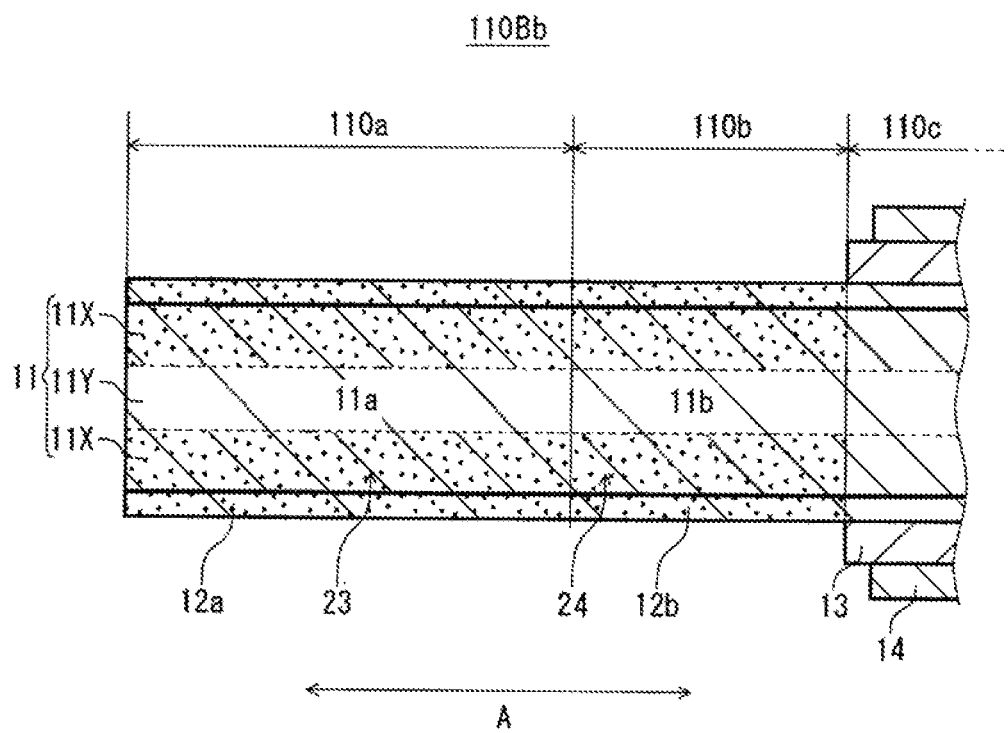
FIG. 4B is a sectional view schematically illustrating a main part of a capacitor element according to a 2b exemplary embodiment of the present invention.

FIG. 4B is a sectional view schematically illustrating a main part of capacitor element 110Bb according to the present exemplary embodiment. Anode part 110a includes third insulating member 23. Third insulating member 23 is disposed in pores of porous region 11X in anode part 110a. Intermediate part 110b includes fourth insulating member 24. Fourth insulating member 24 is disposed in pores of porous region 11X in intermediate part 110b. Third insulating member 23 is in contact with fourth insulating member 24.

2c-th Exemplary Embodiment

A capacitor element according to the present exemplary embodiment includes a third insulating member disposed in pores of the porous region in the anode part, a second insulating member covering the surface of the intermediate part, and a fourth insulating member disposed in pores of the porous region in the intermediate part. The third insulating member, the second insulating member, and the fourth insulating member may be in contact with each other.

Figure 4C:
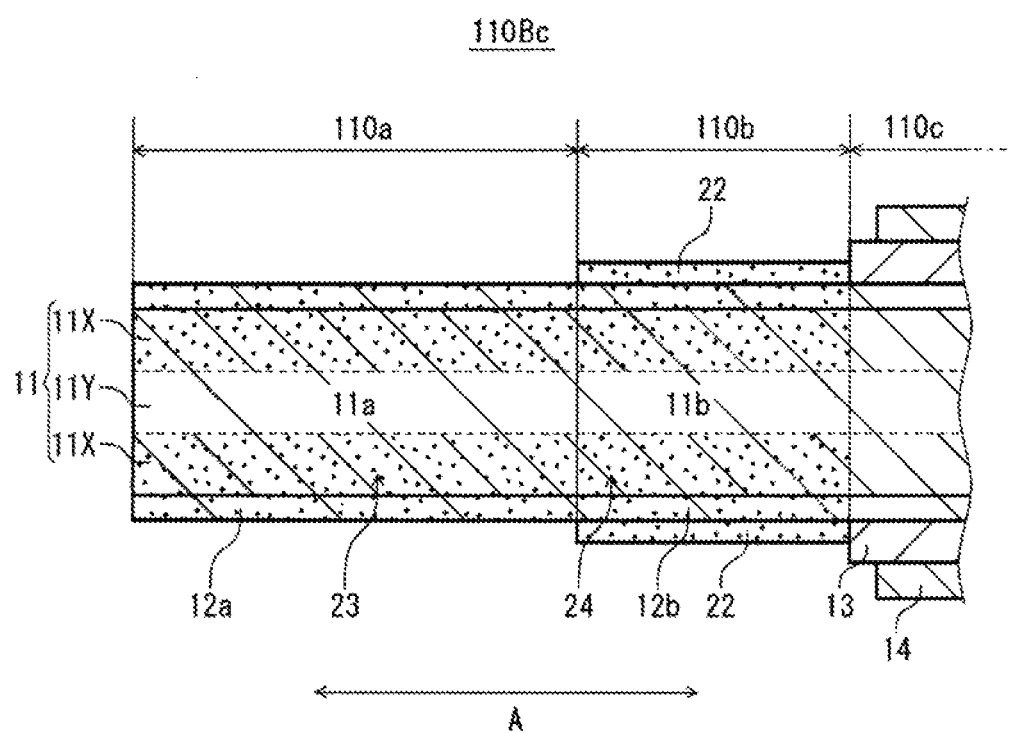
FIG. 4C is a sectional view schematically illustrating a main part of a capacitor element according to a 2c exemplary embodiment of the present invention.

FIG. 4C is a sectional view schematically illustrating a main part of capacitor element 110Bc according to the present exemplary embodiment. Anode part 110a includes third insulating member 23. Third insulating member 23 is disposed in pores of porous region 11X in anode part 110a. Intermediate part 110b includes second insulating member 22 and fourth insulating member 24. Second insulating member 22 covers the surface of intermediate part 110b. Fourth insulating member 24 is disposed in pores of porous region 11X in intermediate part 110b. Third insulating member 23, second insulating member 22, and fourth insulating member 24 are in contact with each other.

(First Insulating Member)

At least a part of the first insulating member is disposed in pores of the porous region in the intermediate part in order to close the pores. The first insulating member contains a first resin component. The first resin component contains a curing product of a reactive compound (first reactive compound). Thus, a change in the shape of the first insulating member is small even under a high temperature, and the closing of the pores is maintained. That is, according to the first insulating member, diffusion of oxygen is suppressed regardless of temperature, so that heat resistance reliability is improved. The first insulating member may further contain a non-reactive resin. Meanwhile, a proportion of the non-reactive resin in the first insulating member is preferably smaller than a proportion of the cured product of the first reactive compound.

An amount of the first insulating member is not particularly limited. A mass of the first insulating member may range, for example, from 10 mg/cm$^2$ to 100 mg/cm$^2$, inclusive. The mass of the first insulating member is calculated as a mass per unit area of one principal surface of the capacitor element in the intermediate part.

The first insulating member may be disposed in the entire porous region in the intermediate part, or may be disposed in a part of the porous region in the intermediate part. From the viewpoint of blocking oxygen, the first insulating member preferably occupies more than or equal to 50% of an area of the voids of the porous region in the intermediate part when the first cross section of the capacitor element is viewed.

An oxygen transmittance of the first insulating member is preferably low. The oxygen transmittance of the first insulating member may be, for example, less than or equal to $1.0\times10^{-9}$ cc·cm/(cm$^2$·sec·cmHg), and less than or equal to $1.0\times10^{-10}$ cc·cm/(cm$^2$·sec·cmHg). The oxygen transmittance is a value measured by an electrolytic sensor method in accordance with JIS K 7126-2 (the same applies hereinafter).

An electric resistance value of the first insulating member is not particularly limited. The electric resistance value of the first insulating member may be, for example, more than or equal to $1.0\times10^{12}$ Ω·m, and more than or equal to $1.0\times10^{13}$ Ω·m.

A tensile strength of the first insulating member is not particularly limited. The tensile strength of the first insulating member may be, for example, more than or equal to 10 MPa, and more than or equal to 50 MP. The tensile strength is a value measured in accordance with JIS K 7161 (the same applies hereinafter).

A tensile elastic modulus of the first insulating member is not particularly limited. The tensile elastic modulus of the first insulating member may be, for example, more than or equal to 100 MPa, and more than or equal to 500 MPa. The tensile elastic modulus is a value measured in accordance with JIS K 7161 (the same applies hereinafter).

(Second Insulating Member)

At least a part of the second insulating member is disposed in a film shape so as to cover the surface of the intermediate part. As a result, the insulation between the anode part and the cathode part is enhanced. The second insulating member may cover at least a part of the surface of the anode part.

The second insulating member contains a second resin component. The second resin component may contain a curing product of a reactive compound, or may contain a non-reactive resin. The curing product of the reactive compound (second reactive compound) contained in the second resin component may be the same type as or a different type from the cured product of the first reactive compound contained in the first insulating member.

Among them, the second resin component preferably contains a non-reactive resin (first non-reactive resin). When the solid electrolyte layer is formed by electrolytic polymerization, it is necessary to fix an electrode to the anode body, as described later. The non-reactive resin usually has moderate tackiness (adhesiveness). Thus, an adhesive tape for fixing an electrode to the anode body can be easily adhered to the second insulating member containing the first non-reactive resin. As a result, stable electrolytic polymerization can be easily performed.

An amount of the second insulating member is not particularly limited. A mass of the second insulating member may range, for example, from 10 mg/cm$^2$ to 100 mg/cm$^2$, inclusive. The mass of the second insulating member is calculated as a mass per unit area of one principal surface of the capacitor element in the intermediate part.

The second insulating member may cover the entire surface of the intermediate part, or may cover a part of the surface of the intermediate part. From the viewpoint of insulation, the second insulating member preferably occupies more than or equal to 80% of the surface area of the intermediate part when one principal surface of the capacitor element is viewed.

An oxygen transmittance of the second insulating member is not particularly limited. The oxygen transmittance of the second insulating member may be, for example, less than or equal to $1.0\times10^{-9}$ cc·cm/(cm$^2$·sec·cmHg), and less than or equal to $1.0\times10^{-10}$ cc·cm/(cm$^2$·sec·cmHg).

An electric resistance value of the second insulating member is preferably large. The electric resistance value of the second insulating member may be, for example, more than or equal to $1.0\times10^{12}$ Ω·m, and more than or equal to $1.0\times10^{13}$ Ω·m.

A tensile strength of the second insulating member is not particularly limited. The tensile strength of the second insulating member may be, for example, more than or equal to 10 MPa, and more than or equal to 50 MP.

A tensile elastic modulus of the second insulating member is not particularly limited. The tensile elastic modulus of the second insulating member may be, for example, more than or equal to 100 MPa, and more than or equal to 500 MPa.

(Third Insulating Member)

At least a part of the third insulating member is disposed in pores of the porous region in the anode part in order to close the pores. The third insulating member contains a third resin component. The third resin component may contain a curing product of a reactive compound, or may contain a non-reactive resin.

Since the third insulating member containing the cured product of a reactive compound has a small change in shape, as described above, diffusion of oxygen is suppressed regardless of temperature, and the strength of the anode part is enhanced. The cured product of a reactive compound (third reactive compound) contained in the third insulating member may be the same type as or a different type from the cured product of the first reactive compound contained in the first insulating member.

The third insulating member containing a non-reactive resin also suppresses the diffusion of oxygen and enhances the strength of the anode part. The non-reactive resin (second non-reactive resin) contained in the third insulating member may be the same type as or a different type from the first non-reactive resin contained in the second insulating member.

An amount of the third insulating member is not particularly limited. A mass of the third insulating member may range, for example, from 10 mg/cm$^2$ to 100 mg/cm$^2$, inclusive. The mass of the third insulating member is calculated as a mass per unit area of one principal surface of the capacitor element in the anode part.

The third insulating member may be disposed in the entire porous region in the anode part, or may be disposed in a part of the porous region in the anode part. From the viewpoint of strength, the third insulating member preferably occupies more than or equal to 50% of the area of the voids of the porous region in the anode part when the first cross section of the capacitor element is viewed.

An oxygen transmittance of the third insulating member is not particularly limited. The oxygen transmittance of the third insulating member may be, for example, less than or equal to $1.0\times10^{-9}$ cc·cm/(cm$^2$·sec·cmHg), and less than or equal to $1.0\times10^{-10}$ cc·cm/(cm$^2$·sec·cmHg).

An electric resistance value of the third insulating member is preferably larger. The electric resistance value of the third insulating member may be, for example, more than or equal to $1.0\times10^{12}$ Ω·m, and more than or equal to $1.0\times10^{13}$ Ω·m.

A tensile strength of the third insulating member is not particularly limited. The tensile strength of the third insulating member may be, for example, more than or equal to 10 MPa, and more than or equal to 50 MP.

A tensile elastic modulus of the third insulating member is not particularly limited. The tensile elastic modulus of the third insulating member may be, for example, more than or equal to 100 MPa, and more than or equal to 500 MPa.

When the third insulating member is disposed, a proportion of the non-reactive resin contained in the third insulating member may be greater than the proportion of the cured product of the third reactive compound.

(Fourth Insulating Member)

At least a part of the fourth insulating member is disposed in pores of the porous region in the intermediate part in order to close the pores. The fourth insulating member contains a fourth resin component. The fourth resin component may contain a curing product of a reactive compound, or may contain a non-reactive resin.

Since the fourth insulating member containing the cured product of the reactive compound has a small change in shape, as described above, diffusion of oxygen can be suppressed regardless of temperature. The cured product of the reactive compound (fourth reactive compound) contained in the fourth insulating member may be the same type as or a different type from the cured product of the third reactive compound contained in the third insulating member.

The fourth insulating member containing a non-reactive resin also suppresses the diffusion of oxygen. The non-reactive resin (third non-reactive resin) contained in the fourth insulating member may be the same type as or a different type from the second non-reactive resin contained in the third insulating member.

An amount of the fourth insulating member is not particularly limited. A mass of the fourth insulating member may range, for example, from 10 mg/cm$^2$ to 100 mg/cm$^2$, inclusive. The mass of the fourth insulating member is calculated as a mass per unit area of one principal surface of the capacitor element in the intermediate part.

The fourth insulating member may be disposed in the entire porous region in the intermediate part, or may be disposed in a part of the porous region in the intermediate part. From the viewpoint of blocking oxygen, the fourth insulating member preferably occupies more than or equal to 50% of the area of the voids of the porous region in the intermediate part when the first cross section of the capacitor element is viewed.

An oxygen transmittance of the fourth insulating member is preferably low. The oxygen transmittance of the fourth insulating member may be, for example, less than or equal to $1.0\times10^{-9}$ cc·cm/(cm$^2$·sec·cmHg), and less than or equal to $1.0\times10^{-10}$ cc·cm/(cm$^2$·sec·cmHg).

An electric resistance value of the fourth insulating member is not particularly limited. The electric resistance value of the fourth insulating member may be, for example, more than or equal to $1.0\times10^{12}$ Ω·m, and more than or equal to $1.0\times10^{13}$ Ω·m.

A tensile strength of the fourth insulating member is not particularly limited. The tensile strength of the fourth insulating member may be, for example, more than or equal to 10 MPa, and more than or equal to 50 MP.

A tensile elastic modulus of the fourth insulating member is not particularly limited. The tensile elastic modulus of the fourth insulating member may be, for example, more than or equal to 100 MPa, and more than or equal to 500 MPa.

(Reactive Compound)

The reactive compound is a polymerizable or crosslinkable compound. The reactive compound may be thermosetting or UV curable.

The first reactive compound, the second reactive compound, the third reactive compound, and the fourth reactive compound (hereinafter, they may be collectively referred to as a reactive compound) may be the same type or different types.

Examples of the reactive compound include curable resins such as a phenol resin, a urea resin, a melamine resin, unsaturated polyester, a furan resin, an epoxy resin, polyurethane, an allyl resin, a silicone resin (silicone), and a curable acrylic resin. Among them, unsaturated polyester is preferable from the viewpoint of permeability to the porous region. The reactive compound may contain one or more types of the curable resins. In addition, the reactive compound may contain the curable resin and a monomer or oligomer that reacts with the curable resin.

A glass transition temperature of the cured product of the reactive compound (hereinafter, may be simply referred to as a cured product) is not particularly limited. The glass transition temperature of the cured product may be, for example, higher than or equal to 100° C., and higher than or equal to 110° C. The glass transition temperature of the cured product may be, for example, lower than or equal to 400° C., lower than or equal to 350° C., and lower than or equal to 200° C. The glass transition temperature is a value measured by a DMA (Dynamic Mechanical Analysis) method under measurement conditions of a temperature increase rate of 2° C./min and a frequency of 1 Hz (the same applies hereinafter).

(Non-Reactive Resin)

The non-reactive resin is a resin having neither a polymerizable reactive group nor a crosslinkable reactive group. The non-reactive resin hardly causes a polymerization reaction and a crosslinking reaction in the manufacturing process of the electrolytic capacitor.

The first non-reactive resin, the second non-reactive resin, and the third non-reactive resin (hereinafter, they may be collectively referred to as a non-reactive resin) may be the same type or different types.

Examples of the non-reactive resin include thermoplastic resins. Among them, engineering plastics, such as general-purpose engineering plastics and super engineering plastics, are preferable from the viewpoints of acid resistance, heat resistance, and strength.

Examples of the engineering plastics include polyester, polyamide, polycarbonate, polyacetal, polyphenylene ether, polyphenylene sulfide, polyether ether ketone, polyacrylic ether ketone, polyamide imide, polyimide, polyether imide, polysulfone, polyether sulfone, and fluororesin. Among them, polyamide imide and PTFE (polytetrafluoroethylene) are preferable from the viewpoint of acid resistance.

The glass transition temperature of the non-reactive resin is preferably high. The glass transition temperature of the non-reactive resin may be, for example, higher than or equal to 100° C., and higher than or equal to 110° C. In addition, the glass transition temperature of the non-reactive resin may be, for example, lower than or equal to 400° C., and lower than or equal to 350° C.

The glass transition point of the non-reactive resin is preferably high. The glass transition point of the non-reactive resin may be, for example, higher than or equal to 100° C., and higher than or equal to 110° C. In addition, the glass transition point of the non-reactive resin may be, for example, lower than or equal to 400° C., and lower than or equal to 350° C.

(Anode Body)

The anode body contains a foil (metal foil) containing a valve metal. Examples of the valve metal include titanium, tantalum, aluminum, and niobium. The anode body contains one or more types of the valve metals. The anode body may contain the valve metal in the form of an alloy or an intermetallic compound. A thickness of the anode body is not particularly limited. The thickness of the anode body may range, for example, from 15 µm to 300 inclusive, and from 80 µm to 250 inclusive.

The principal surface of the anode body is roughened by electrolytic etching or the like. Thus, the anode body includes a porous region formed on the principal surface side thereof. The entire anode body may be porous. From the viewpoint of strength, however, the anode body preferably includes the porous regions disposed on both principal surface sides and a core region interposed between the porous regions. The core region has a lower porosity than the porous region. The core region is, for example, a region that has not been subjected to electrolytic etching. The porous region and the core region can be distinguished by observing the first cross section of the capacitor element.

A thickness of the porous region is not particularly limited. From the viewpoint of electrostatic capacity, the thickness of the porous region disposed on one principal surface side of the anode body is preferably more than or equal to 20% of the thickness of the anode body before subjected to the surface roughening. From the viewpoint of strength, the thickness of the porous region is preferably less than or equal to 40% of the thickness of the anode body before subjected to the surface roughening. The thickness of the porous region is an average value of distances, at arbitrary three points in the first cross section of the capacitor element, from one principal surface of the anode body to a boundary between the porous region formed on the principal surface side and the core region in the anode part.

(Dielectric Layer)

The dielectric layer is formed on at least a part of the surface of the anode body. The dielectric layer is formed, for example, by anodizing the surface of the anode body with an anodizing treatment or the like. Thus, the dielectric layer can contain an oxide of the valve metal. When aluminum, for example, is used as the valve metal, the dielectric layer can contain $Al_2O_3$. Note that the dielectric layer is not limited thereto, and may be any one that functions as a dielectric material.

(Solid Electrolyte Layer)

The solid electrolyte layer only has to be formed to cover at least a part of the dielectric layer, and may be formed to cover the entire surface of the dielectric layer.

The solid electrolyte layer contains, for example, a manganese compound and a conductive polymer. Examples of the conductive polymer include polypyrrole, polythiophene, polyfuran, polyaniline, polyacetylene, polyphenylene, polyphenylene vinylene, polyacene, and polythiophene vinylene. These may be used alone, may be used in combination of two or more types, or may be a copolymer of two or more types of monomers.

Note that in the present description, polypyrrole, polythiophene, polyfuran, polyaniline, and the like mean polymers having, as a basic skeleton, polypyrrole, polythiophene, polyfuran, polyaniline, and the like, respectively. Therefore, polypyrrole, polythiophene, polyfuran, polyaniline, and the like can also include derivatives thereof, respectively. For example, polythiophene contains poly(3,4-ethylenedioxythiophene) and the like.

The conductive polymer may be contained in the solid electrolyte layer together with a dopant. The dopant may be a monomolecular anion or a polymeric anion. Specific examples of the monomolecular anion include p-toluenesulfonic acid and naphthalenesulfonic acid. Specific examples of the polymeric anion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These may be used alone, or may be used in combination of two or more types. Alternatively, these may be a polymer of a single monomer or a copolymer of two or more types of monomers. Among them, a polymeric anion derived from polystyrenesulfonic acid is preferable.

(Cathode Lead-Out Layer)

The cathode lead-out layer only has to be formed to cover at least a part of the solid electrolyte layer, and may be formed to cover the entire surface of the solid electrolyte layer.

The cathode lead-out layer includes, for example, a carbon layer and a metal (e.g., silver) paste layer formed on a surface of the carbon layer. The carbon layer is formed of a carbon paste containing a conductive carbon material such as graphite. The metal paste layer is formed of, for example, a composition containing silver particles and a resin. Note that the configuration of the cathode lead-out layer is not limited thereto, and may be any configuration having a current collecting function.

(Lead Terminal)

An anode lead terminal and a cathode lead terminal are joined to the anode part and the cathode part of the capacitor element, respectively. Each lead terminal and the anode part or the cathode part are joined to each other via a conductive adhesive or solder, or by resistance welding or laser welding. Each lead terminal is electrically connected to the anode part or the cathode part. The conductive adhesive is, for example, a mixture of the curable resin described above and carbon particles or metal particles.

The material of the lead terminal is not particularly limited as long as it is electrochemically and chemically stable and has conductivity, and may be metal or non-metal. The shape thereof is also not particularly limited. From the viewpoint of height reduction, a thickness of the lead terminal (distance between principal surfaces of the lead terminal) ranges preferably from 25 µm to 200 µm, inclusive, and more preferably from 25 µm to 100 µm, inclusive.

(Sealing Resin)

The capacitor element may be sealed with a sealing resin such that at least a part of each of the anode lead terminal and the cathode lead terminal is exposed. Examples of the sealing resin include the curing products of the curable resins and the engineering plastics that have been described above.

The electrolytic capacitor may include a plurality of the capacitor elements. The plurality of the capacitor elements are laminated. The number of the laminated capacitor elements is not particularly limited, and ranges, for example, from 2 to 20, inclusive.

The anode parts of the laminated capacitor elements are joined by welding, swaging, or the like in order to be electrically connected to each other. The anode lead terminal is joined to the anode part of at least one capacitor element. The plurality of the anode parts are swaged by, for example, the anode lead terminals that have been bent. The anode part and the anode lead terminal may be further laser welded.

The cathode parts of the laminated capacitor elements are also electrically connected to each other. The cathode lead terminal is joined to a cathode layer of at least one capacitor element. The cathode lead terminal is joined to the cathode layer via, for example, a conductive adhesive.

Figure 5:
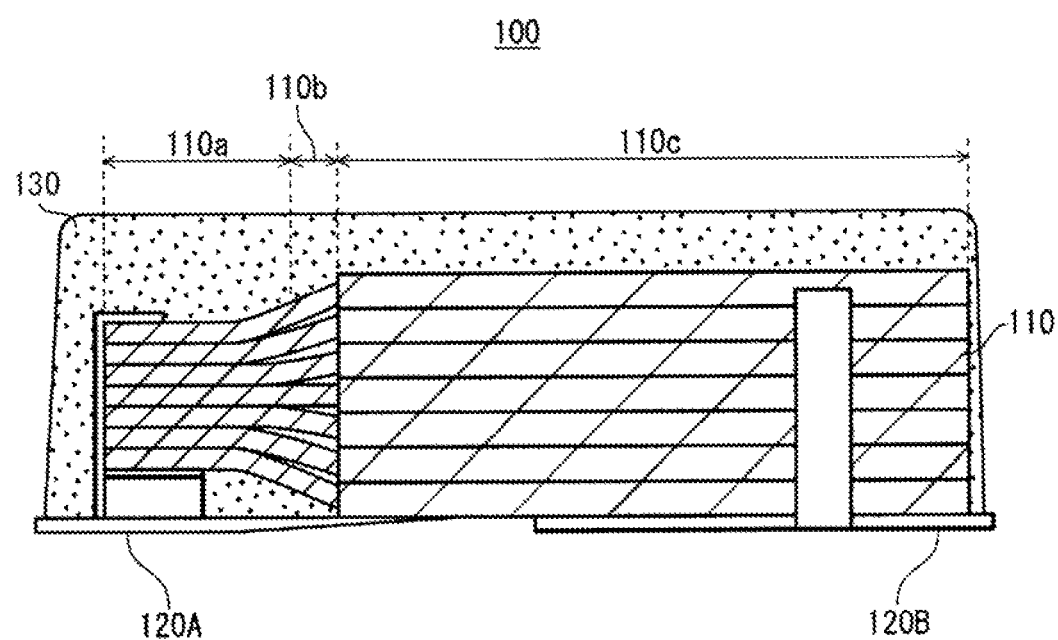
FIG. 5 is a sectional view schematically illustrating an electrolytic capacitor according to an exemplary embodiment of the present invention.

FIG. 5 is a sectional view schematically illustrating the electrolytic capacitor (the first electrolytic capacitor or the second electrolytic capacitor) according to the present exemplary embodiment. Electrolytic capacitor 100 includes one or more capacitor elements 110, anode lead terminal 120A joined to anode part 110a of capacitor elements 110, cathode lead terminal 120B joined to cathode part 110c, and sealing resin 130 for sealing capacitor elements 110.

[Method for Manufacturing Electrolytic Capacitor]

The electrolytic capacitor according to the present exemplary embodiment can be manufactured by the following method. The present exemplary embodiment includes a method for manufacturing an electrolytic capacitor.

I. First Manufacturing Method

A first method for manufacturing an electrolytic capacitor according to the present exemplary embodiment includes: a preparation step of preparing an anode body having a porous region; a dielectric layer forming step of forming a dielectric layer on at least a part of a surface of the anode body; a first application step of defining an anode region, a cathode region, and an intermediate region interposed between the anode region and the cathode region in the anode body, and then applying a first insulating material containing a first resin component to the intermediate region so that at least a part of the first insulating material is disposed in pores of a porous region in the intermediate region; a curing step of curing a first reactive compound contained in the first resin component; and a cathode part forming step of forming a solid electrolyte layer covering at least a part of the dielectric layer in the cathode region and a cathode lead-out layer covering at least a part of the solid electrolyte layer.

(1) Preparation Step

As a raw material of the anode body, for example, a metal foil containing a valve metal is used.

At least one principal surface of the metal foil is roughened. By the roughening, a porous region having a large number of fine pores is formed at least on a principal surface side of the metal foil.

The roughening is performed by, for example, electrolytic etching of the metal foil. The electrolytic etching can be performed by, for example, a direct current electrolyzing method or an alternating current electrolyzing method. Etching conditions are not particularly limited, and are appropriately set according to a depth of the porous region, the type of the valve metal, and the like.

(2) Dielectric Layer Forming Step

A dielectric layer is formed on the surface of the anode body. A method for forming the dielectric layer is not particularly limited. The dielectric layer can be formed, for example, by subjecting the anode body to an anodizing treatment. In the anodizing treatment, for example, the anode body is immersed in an anodizing solution, such as an ammonium adipate solution, and subjected to a heat treatment. The anode body may be immersed in an anodizing solution, and a voltage may be applied.

(3-1) First Application Step

After the dielectric layer forming step and before the cathode part forming step, a first insulating material containing a first resin component is applied to the intermediate region, and at least a part of the first insulating material is disposed in pores of the porous region in the intermediate region. The first insulating material is a raw material of the first insulating member described above.

The first insulating material is applied to the intermediate region by, for example, a printing method, a method using a dispenser, a transfer method, or the like. An application amount of the first insulating material is not particularly limited. The first insulating material is applied such that the mass of the first insulating member ranges, for example, from 10 mg/cm$^2$ to 100 mg/cm$^2$, inclusive.

(3-2) Curing Step of Curing First Reactive Compound

After the first application step, the first reactive compound contained in the first resin component is cured. A curing method is appropriately selected according to the first reactive compound. The curing method is, for example, heating or UV irradiation. Curing conditions are also appropriately selected according to the first reactive compound.

(4-1) Second Application Step

After the first application step and before the cathode part forming step, a second insulating material containing a second resin component is applied to the intermediate region, and at least a part of the second insulating material may be disposed to cover the surface of the intermediate region. The second insulating material is a raw material of the second insulating member described above.

The second application step may be performed after the first application step and before the curing step of curing the first reactive compound, or may be performed after the curing step of curing the first reactive compound. Among them, the second application step is preferably performed after the curing step of curing the first reactive compound. As a result, diffusion of the first insulating material is suppressed, and a decrease in electrostatic capacity is easily suppressed. Furthermore, mixing of the first insulating material and the second insulating material is suppressed. Thus, each insulating material is easily fixed to a predetermined position, and the oxygen blocking effect and the insulating effect can be more easily obtained.

The second insulating material is applied to the intermediate region, for example, in the same way as the first insulating material. The second insulating material is applied such that the mass of the second insulating member ranges, for example, from 10 mg/cm$^2$ to 100 mg/cm$^2$, inclusive.

(4-2) Fixing Step of Fixing Second Resin Component

After the second application step and before the cathode part forming step, the second resin component is fixed to the surface of the intermediate region.

When the second resin component contains a reactive compound, the second resin component is fixed by curing the reactive compound. A curing method is appropriately selected according to the reactive compound. The curing method is, for example, heating or UV irradiation. Curing conditions are also appropriately selected according to the reactive compound.

When the second resin component contains a non-reactive resin, the second resin component is fixed by solidifying the non-reactive resin. A solidification method is, for example, heating or air drying. Solidification conditions are appropriately selected according to the non-reactive resin.

(5-1) Third Application Step

After the dielectric layer forming step and before the cathode part forming step, a third insulating material containing a third resin component is applied to the anode region, and at least a part of the third insulating material may be disposed in pores of the porous region in the anode region. The third insulating material is a raw material of the third insulating member described above.

The third application step may be performed before the first application step, may be performed after the first application step, or may be performed in parallel with the first application step.

From the viewpoint of easily disposing the third resin material in the anode region, the third application step is preferably performed after the first application step. By applying the third insulating material after the first insulating material is applied to the intermediate region, diffusion of the third insulating material up to the intermediate region is suppressed. The third application step may be performed after the first application step and before the curing step of curing the first reactive compound, or may be performed after the curing step of curing the first reactive compound. Among them, the third application step is preferably performed after the curing step of curing the first reactive compound. As a result, the first insulating material and the third insulating material are easily fixed to predetermined positions, respectively, and the oxygen blocking effect and the effect of improving the strength of the anode part can be more easily obtained.

From the viewpoint of productivity, the third application step is preferably performed in parallel with the first application step. That is, it is preferable to apply the third insulating material to the anode region simultaneously or continuously with the application of the first insulating material to the intermediate region. As a result, man-hours can be reduced. This method is particularly suitable when the first reactive compound contained in the first insulating material and the third reactive compound contained in the third insulating material are of the same type. Meanwhile, a viscosity of the first insulating material may be different from a viscosity of the third insulating material. For example, the viscosity of the third insulating material may be less than the viscosity of the first insulating material.

The third insulating material is applied to the anode region, for example, in the same way as the first insulating material. The third insulating material is applied such that the mass of the third insulating member ranges, for example, from 10 mg/cm$^2$ to 100 mg/cm$^2$, inclusive.

(5-2) Fixing Step of Fixing Third Resin Component

After the third application step and before the cathode part forming step, the third resin component is fixed in pores of the porous region in the anode region.

When the third resin component contains a reactive compound (third reactive compound), the third resin component is fixed by curing the third reactive compound. A curing method is appropriately selected according to the third reactive compound. The curing method is, for example, heating or UV irradiation. Curing conditions are also appropriately selected according to the third reactive compound.

When the third resin component contains the second non-reactive resin, the third resin component is fixed by solidifying the second non-reactive resin. A solidification method is, for example, heating or air drying. Solidification conditions are appropriately selected according to the second non-reactive resin.

(6) Cathode Part Forming Step

A solid electrolyte layer is formed on a surface of the dielectric layer. The solid electrolyte layer can be formed by chemical polymerization and/or electrolytic polymerization of a raw material monomer or oligomer under the presence of the anode body. The solid electrolyte layer may be formed by applying a solution in which the conductive polymer is dissolved or a dispersion liquid in which the conductive polymer is dispersed to the dielectric layer.

The raw material monomer or oligomer is a monomer or oligomer to be a raw material of the conductive polymer. Examples thereof include pyrrole, aniline, thiophene, and derivatives thereof. The polymerization solution to be used for the chemical polymerization and/or the electrolytic polymerization may contain the dopant described above in addition to the raw material monomer or oligomer.

Next, a carbon paste and a silver paste, for example, are sequentially applied to the surface of the solid electrolyte layer to form a cathode lead-out layer. As a result, the cathode part is formed.

(7) Lead Terminal Connecting Step

The anode lead terminal is electrically connected to the anode body, and the cathode lead terminal is electrically connected to the cathode lead-out layer. Electrical connection between the anode body and the anode lead terminal is made, for example, by welding them. Electrical connection between the cathode lead-out layer and the cathode lead terminal is made, for example, by bonding the cathode lead-out layer and the cathode lead terminal via a conductive adhesive.

(8) Sealing Step

The capacitor element and a part of the lead terminal may be sealed with a sealing resin. The sealing is performed using a molding technique such as injection molding, insert molding, or compression molding. For example, the exterior of the capacitor element and one end of each of the lead terminals is filled with a composition containing a curable resin or a thermoplastic resin by using a predetermined mold, so that they are covered. Then, it is subjected to heating or the like.

Hereinafter, a method for manufacturing an electrolytic capacitor according to the present exemplary embodiment will be specifically described with reference to the drawings. However, the present exemplary embodiment is not limited thereto.

Ia-th Exemplary Embodiment

Figure 6:
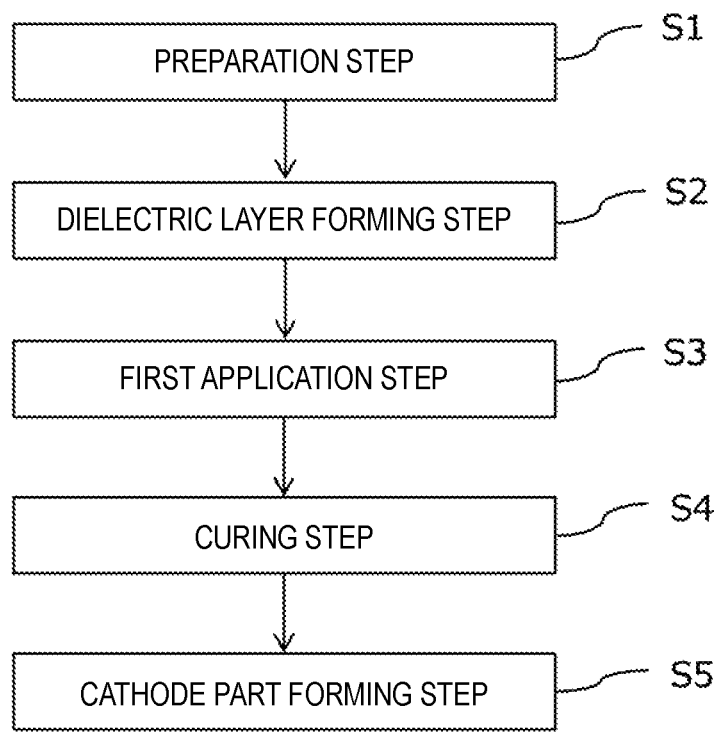
FIG. 6 is a flowchart showing a method for manufacturing an electrolytic capacitor according to an Ia exemplary embodiment of the present invention.

A manufacturing method according to the present exemplary embodiment includes the first application step. FIG. 6 is a flowchart showing the method for manufacturing an electrolytic capacitor according to the present exemplary embodiment.

In the present exemplary embodiment, preparation step (S1), dielectric layer forming step (S2), first application step (S3), curing step (S4), and cathode part forming step (S5) are performed in this order. As a result, the first insulating member is efficiently disposed in pores of the porous region in the intermediate part.

Ib-th Exemplary Embodiment

Figure 7:
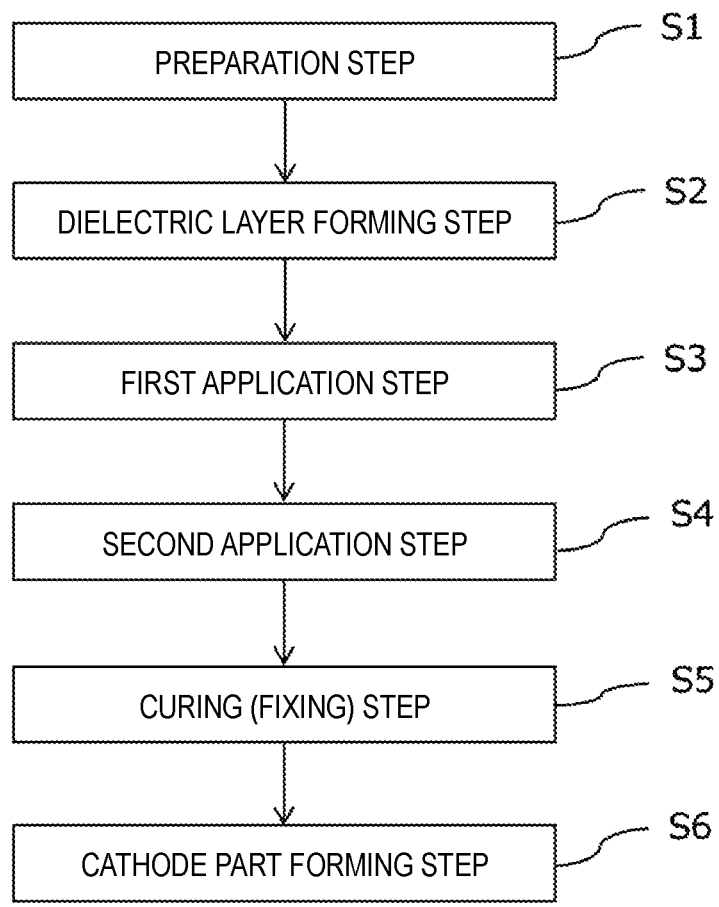
FIG. 7 is a flowchart showing a method for manufacturing an electrolytic capacitor according to an Ib exemplary embodiment of the present invention.

A manufacturing method according to the present exemplary embodiment includes the first application step and the second application step. In this case, the first application step is performed before the second application step. FIG. 7 is a flowchart showing the method for manufacturing an electrolytic capacitor according to the present exemplary embodiment.

In the present exemplary embodiment, preparation step (S1), dielectric layer forming step (S2), first application step (S3), second application step (S4), curing (fixing) step (S5), and cathode part forming step (S6) are performed in this order. As a result, the first insulating member is efficiently disposed in pores of the porous region in the intermediate part, and the second insulating member is disposed to cover the surface of the intermediate part. In the curing (fixing) step, the first insulating material is cured and the second insulating material is cured or solidified, so that they are fixed to predetermined positions, respectively.

Ic-th Exemplary Embodiment

Figure 8:
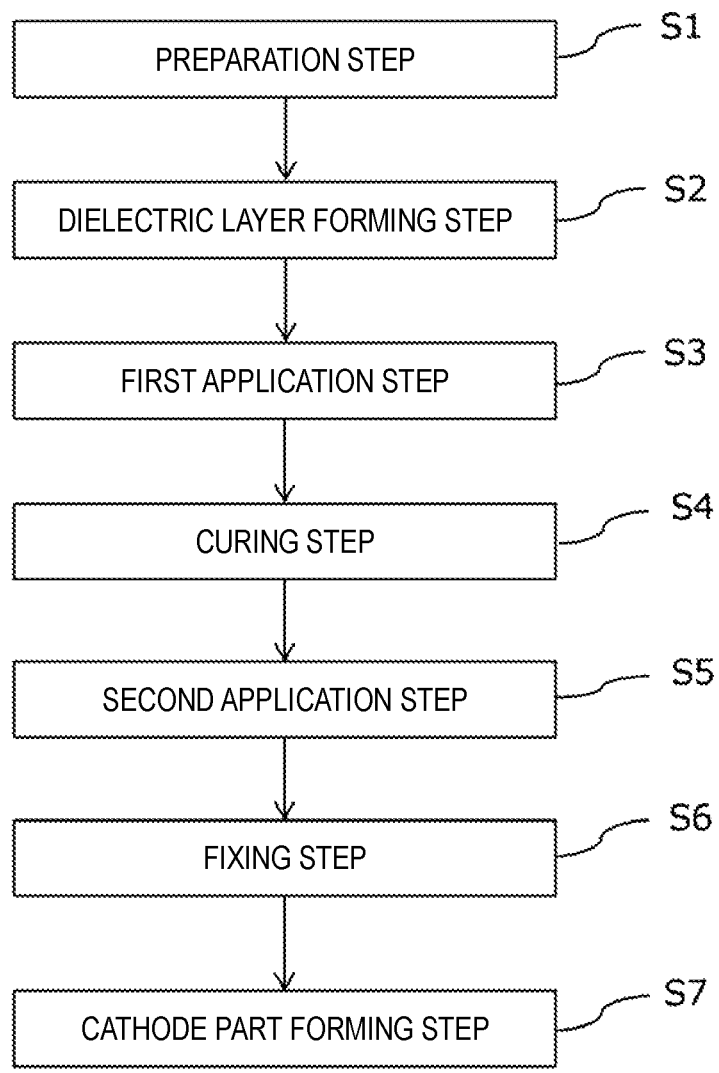
FIG. 8 is a flowchart showing a method for manufacturing an electrolytic capacitor according to an Ic exemplary embodiment of the present invention.

A manufacturing method according to the present exemplary embodiment is the same as that of the Ib-th exemplary embodiment except that curing step (S4) is performed after first application step (S3). FIG. 8 is a flowchart showing the method for manufacturing an electrolytic capacitor according to the present exemplary embodiment.

In the curing step immediately after the first application step, the first insulating material is cured and fixed to a predetermined position. In the fixing step immediately after the second application step, the second insulating material is cured or solidified and fixed to a predetermined position. Also in this case, the first insulating member is efficiently disposed in pores of the porous region in the intermediate part, and the second insulating member is disposed to cover the surface of the intermediate part.

Id-th Exemplary Embodiment

Figure 9:
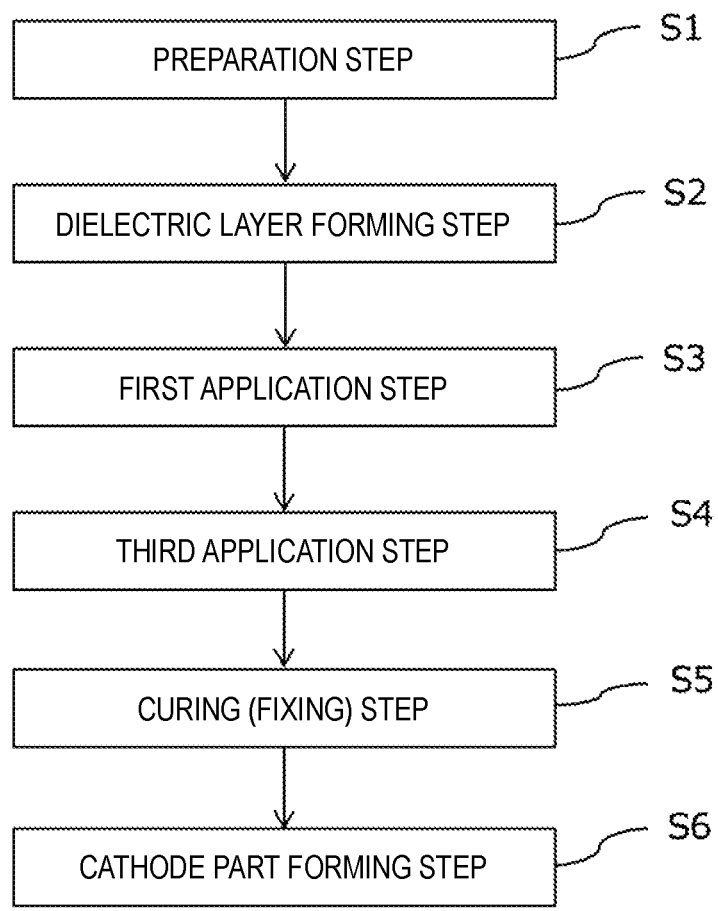
FIG. 9 is a flowchart showing a method for manufacturing an electrolytic capacitor according to an Id exemplary embodiment of the present invention.

A manufacturing method according to the present exemplary embodiment includes the first application step and the third application step. FIG. 9 is a flowchart showing the method for manufacturing an electrolytic capacitor according to the present exemplary embodiment.

In the present exemplary embodiment, preparation step (S1), dielectric layer forming step (S2), first application step (S3), third application step (S4), curing (fixing) step (S5), and cathode part forming step (S6) are performed in this order. As a result, the first insulating member is efficiently disposed in pores of the porous region in the intermediate part, and the third insulating member is efficiently disposed in pores of the porous region in the anode part. In the curing (fixing) step, the first insulating material is cured and the third insulating material is cured or solidified, so that they are fixed to predetermined positions, respectively.

Meanwhile, the third application step may be performed before the first application step, or may be performed in parallel with the first application step.

Ie-th Exemplary Embodiment

Figure 10:
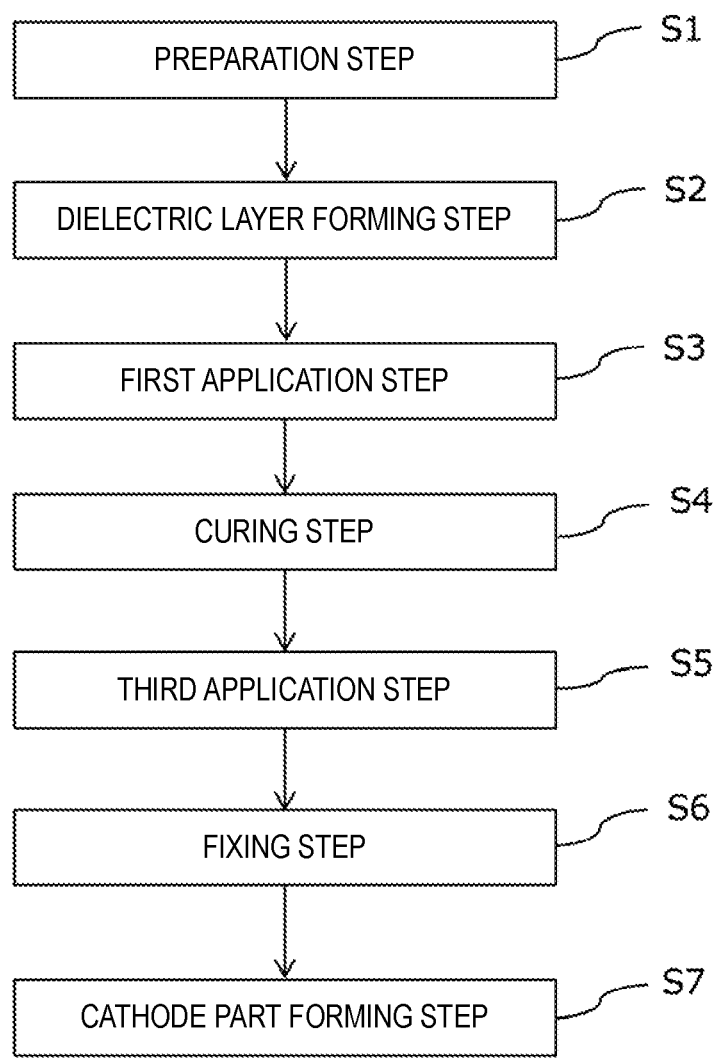
FIG. 10 is a flowchart showing a method for manufacturing an electrolytic capacitor according to an Ie exemplary embodiment of the present invention.

A manufacturing method according to the present exemplary embodiment is the same as that of the Id-th exemplary embodiment except that curing step (S4) is performed after first application step (S3). FIG. 10 is a flowchart showing the method for manufacturing an electrolytic capacitor according to the present exemplary embodiment.

In the curing step immediately after the first application step, the first insulating material is cured and fixed to a predetermined position. In the fixing step immediately after the third application step, the third insulating material is cured or solidified and fixed to a predetermined position. Also in this case, the first insulating member is efficiently disposed in pores of the porous region in the intermediate part, and the third insulating member is efficiently disposed in pores of the porous region in the anode part.

If-th Exemplary Embodiment

Figure 11:
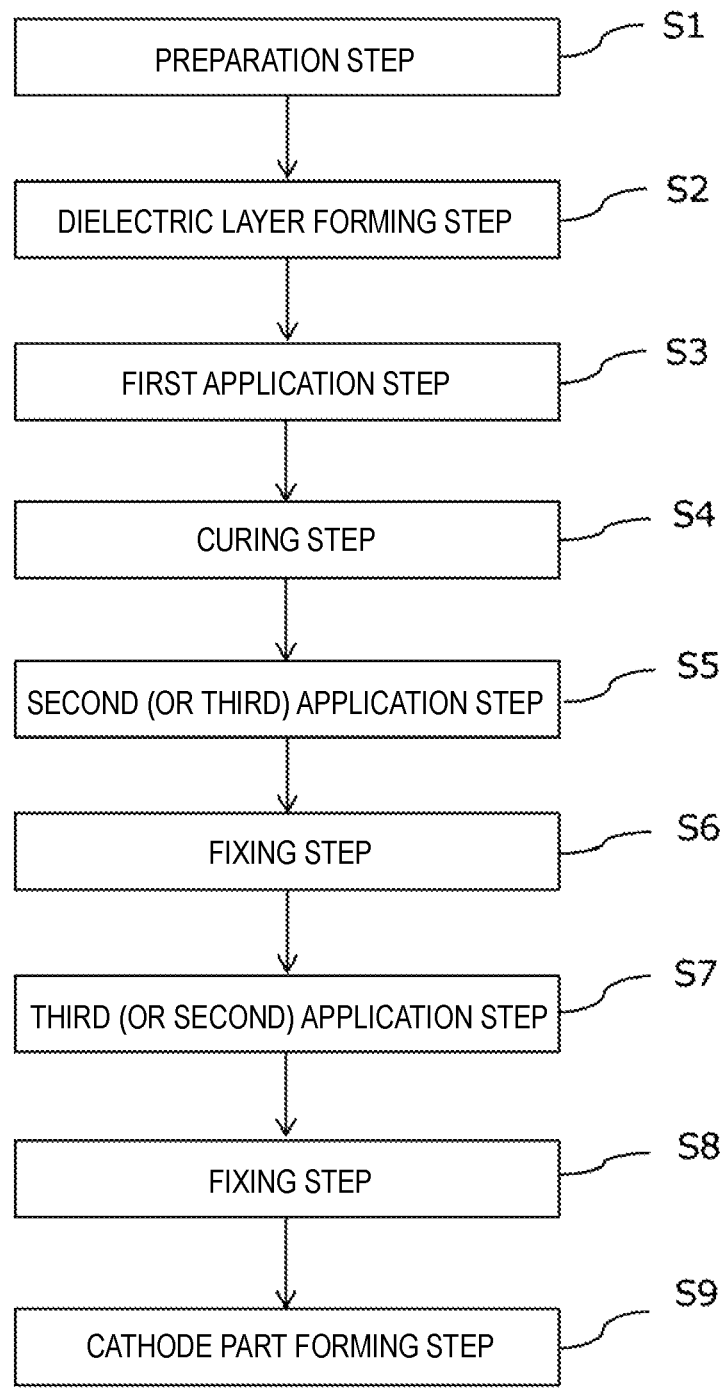
FIG. 11 is a flowchart showing a method for manufacturing an electrolytic capacitor according to an If exemplary embodiment of the present invention.

A manufacturing method according to the present exemplary embodiment includes the first application step, the second application step, and the third application step. In this case, the first application step is performed before the second application step and the third application step. FIG. 11 is a flowchart showing the method for manufacturing an electrolytic capacitor according to the present exemplary embodiment.

In the present exemplary embodiment, preparation step (S1), dielectric layer forming step (S2), first application step (S3), curing step (S4), second (or third) application step (S5), fixing step (S6), third (or second) application step (S7), fixing step (S8), and cathode part forming step (S9) are performed in this order. As a result, the first insulating member is efficiently disposed in pores of the porous region in the intermediate part, the second insulating member is disposed to cover the surface of the intermediate part, and the third insulating member is efficiently disposed in pores of the porous region in the anode part.

Ig-th Exemplary Embodiment

Figure 12:
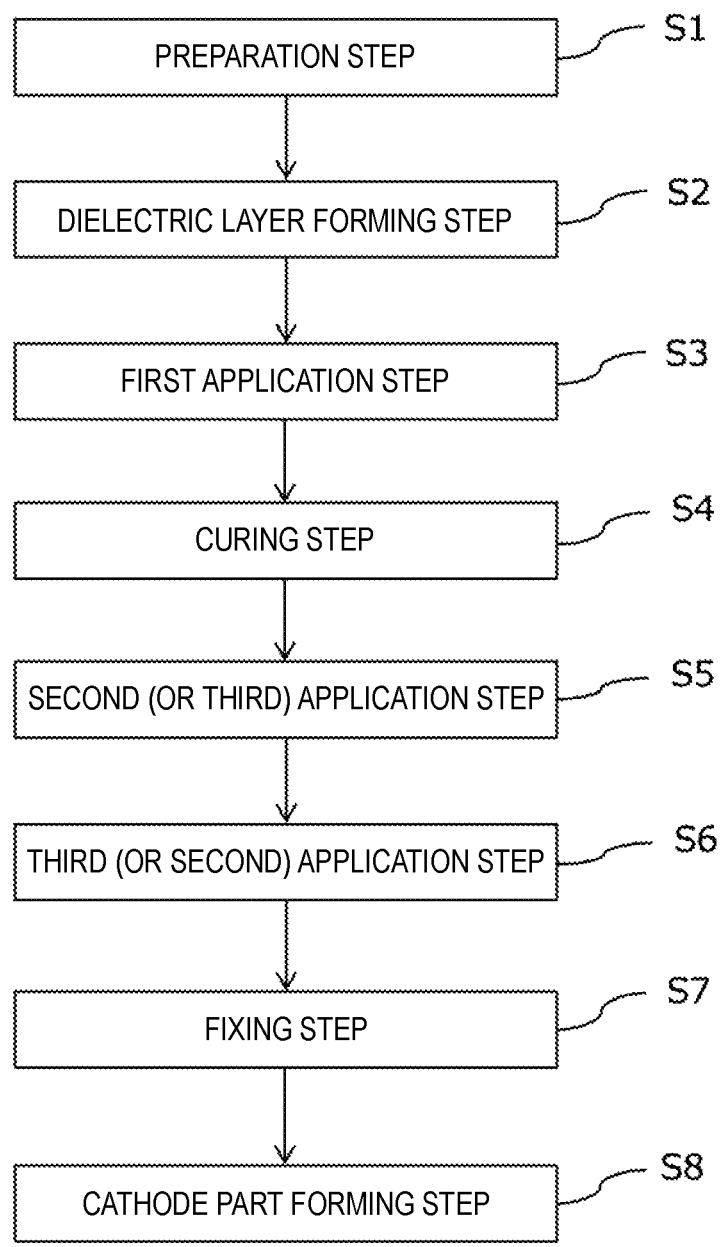
FIG. 12 is a flowchart showing a method for manufacturing an electrolytic capacitor according to an Ig exemplary embodiment of the present invention.

A manufacturing method according to the present exemplary embodiment is the same as that of the If-th exemplary embodiment except that the fixing step after second (or third) application step (S5) is omitted. FIG. 12 is a flowchart showing the method for manufacturing an electrolytic capacitor according to the present exemplary embodiment. Also in this case, the first insulating member is efficiently disposed in pores of the porous region in the intermediate part, the second insulating member is disposed to cover the surface of the intermediate part, and the third insulating member is efficiently disposed in pores of the porous region in the anode part.

Ih-th Exemplary Embodiment

Figure 13:
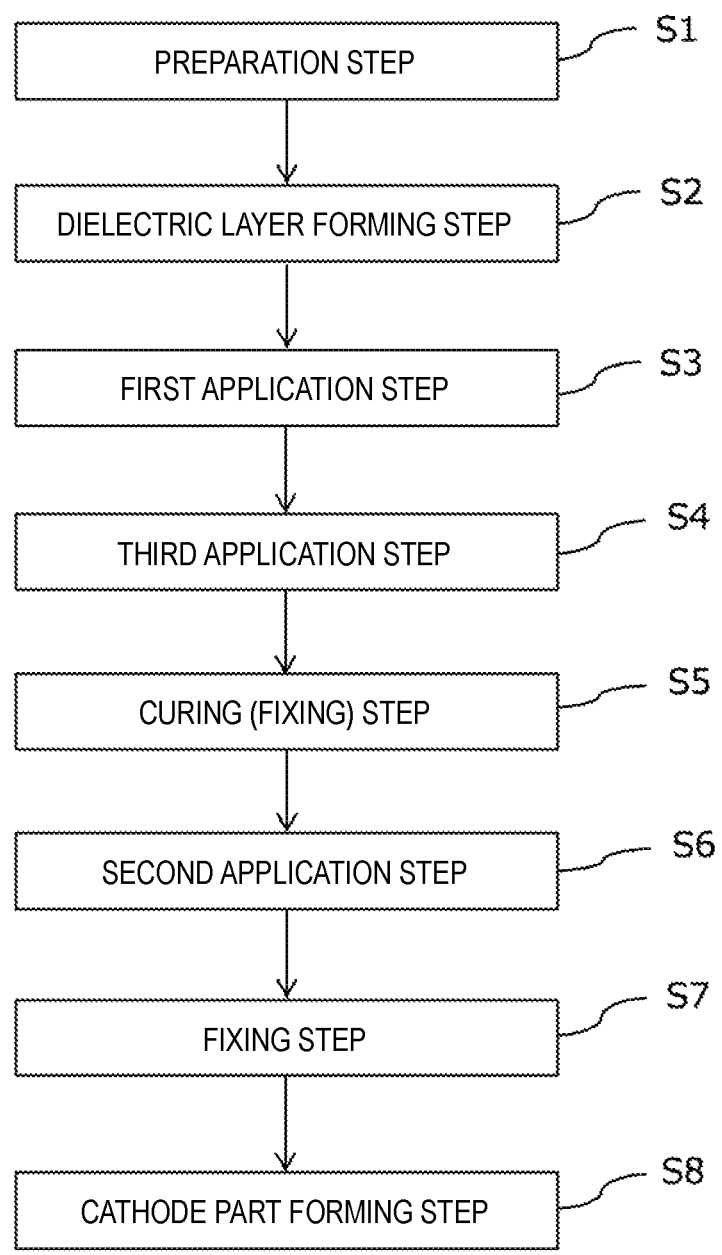
FIG. 13 is a flowchart showing a method for manufacturing an electrolytic capacitor according to an Ih exemplary embodiment of the present invention.

A manufacturing method according to the present exemplary embodiment is the same as that of the If-th exemplary embodiment except that the curing step after first application step (S3) is omitted and subsequently the third application step is performed. FIG. 13 is a flowchart showing the method for manufacturing an electrolytic capacitor according to the present exemplary embodiment. Also in this case, the first insulating member is efficiently disposed in pores of the porous region in the intermediate part, the second insulating member is disposed to cover the surface of the intermediate part, and the third insulating member is efficiently disposed in pores of the porous region in the anode part.

II. Second Manufacturing Method

A second method for manufacturing an electrolytic capacitor according to the present exemplary embodiment includes: a preparation step of preparing an anode body having a porous region; a dielectric layer forming step of forming a dielectric layer on at least a part of a surface of the anode body; a third application step of defining an anode region, a cathode region, and an intermediate region interposed between the anode region and the cathode region in the anode body, and then applying a third insulating material containing a third resin component to the anode region so that at least a part of the third insulating material is disposed in pores of a porous region in the anode region; a fixing step of fixing the third resin component; and a cathode part forming step of forming a solid electrolyte layer covering at least a part of the dielectric layer in the cathode region and a cathode lead-out layer covering at least a part of the solid electrolyte layer.

Preparation step (1) and dielectric layer forming step (2) are performed in the same way as the preparation step and the dielectric layer forming step in the first manufacturing method.

(3-1) Third Application Step

After the dielectric layer forming step and before the cathode part forming step, a third insulating material containing a third resin component is applied to the anode region, and at least a part of the third insulating material is disposed in pores of the porous region in the anode region. The third insulating material is a raw material of the third insulating member described above. The third application step is performed in the same way as the third application step in the first manufacturing method.

(3-2) Fixing Step of Fixing Third Resin Component

After the third application step and before the cathode part forming step, the third resin component is fixed in pores of the porous region in the anode region. Fixing of the third resin component is performed in the same way as in the fixing step of fixing the third resin component in the first manufacturing method.

(4-1) Second Application Step

After the dielectric layer forming step and before the cathode part forming step, a second insulating material containing a second resin component may be applied to the intermediate region in order that at least a part of the second insulating material is disposed to cover the surface of the intermediate region. The second insulating material is a raw material of the second insulating member described above.

The second application step may be performed before or after the third application step and the fixing step of fixing the third resin component. The second application step is performed in the same way as the second application step in the first manufacturing method.

(4-2) Fixing Step of Fixing Second Resin Component

After the second application step and before the cathode part forming step, the second resin component is fixed to the surface of the intermediate region. The fixing step of fixing the second resin component is performed in the same way as the fixing step of fixing the second resin component in the first manufacturing method.

(5-1) Fourth Application Step

After the dielectric layer forming step and before the cathode part forming step, a fourth insulating material containing a fourth resin component may be applied to the intermediate region in order that at least a part of the fourth insulating material is disposed in pores of the porous region in the intermediate region. The fourth insulating material is a raw material of the fourth insulating member described above.

The fourth application step is performed in the same way as the first application step in the first manufacturing method. When the second application step is performed, the fourth application step is performed before the second application step. The fourth application step may be performed before the third application step, may be performed after the third application step, or may be performed in parallel with the third application step.

From the viewpoint of easily disposing the third resin material in the anode region, the fourth application step is preferably performed before the third application step. By applying the third insulating material after the fourth insulating material is applied to the intermediate region, diffusion of the third insulating material up to the intermediate region is suppressed. The third application step may be performed after the fourth application step and before the fixing step of fixing the fourth resin component, or may be performed after the fixing step of fixing the fourth resin component. Among them, the third application step is preferably performed after the fixing step of fixing the fourth resin component. As a result, the third insulating material and the fourth insulating material are easily fixed to predetermined positions, respectively, and the oxygen blocking effect and the effect of improving the strength of the anode part can be more easily obtained.

From the viewpoint of productivity, the fourth application step is preferably performed in parallel with the third application step. That is, it is preferable to apply the fourth insulating material to the intermediate region simultaneously or continuously with the application of the third insulating material to the anode region. As a result, man-hours can be reduced. This method is particularly suitable when the third resin component contained in the third insulating material and the fourth resin component contained in the fourth insulating material are of the same type. Meanwhile, a viscosity of the third insulating material may be different from a viscosity of the fourth insulating material. For example, the viscosity of the third insulating material may be less than the viscosity of the fourth insulating material.

(5-2) Fixing Step of Fixing Fourth Resin Component

After the fourth application step and before the cathode part forming step, the fourth resin component is fixed in pores of the porous region in the anode region. The fixing step of fixing the fourth resin component is performed in the same way as the fixing step of fixing the third resin component.

Subsequently, cathode part forming step (6), lead terminal connecting step (7), and sealing step (8) are performed. These steps are performed in the same ways as the cathode part forming step, the lead terminal connecting step, and the sealing step in the first manufacturing method, respectively.

Hereinafter, a method for manufacturing an electrolytic capacitor according to the present exemplary embodiment will be specifically described with reference to the drawings. However, the present exemplary embodiment is not limited thereto.

IIa-th Exemplary Embodiment

Figure 14:
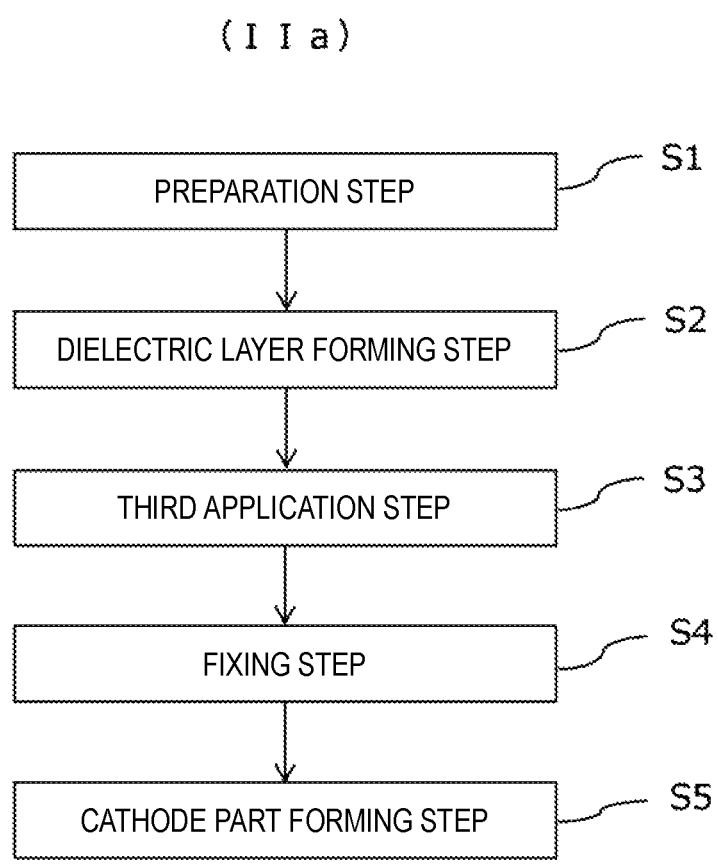
FIG. 14 is a flowchart showing a method for manufacturing an electrolytic capacitor according to an IIa exemplary embodiment of the present invention.

A manufacturing method according to the present exemplary embodiment includes the third application step. FIG. 14 is a flowchart showing the method for manufacturing an electrolytic capacitor according to the present exemplary embodiment.

In the present exemplary embodiment, preparation step (S1), dielectric layer forming step (S2), third application step (S3), fixing step (S4), and cathode part forming step (S5) are performed in this order. As a result, the third insulating member is efficiently disposed in pores of the porous region in the anode part.

IIb-th Exemplary Embodiment

Figure 15:
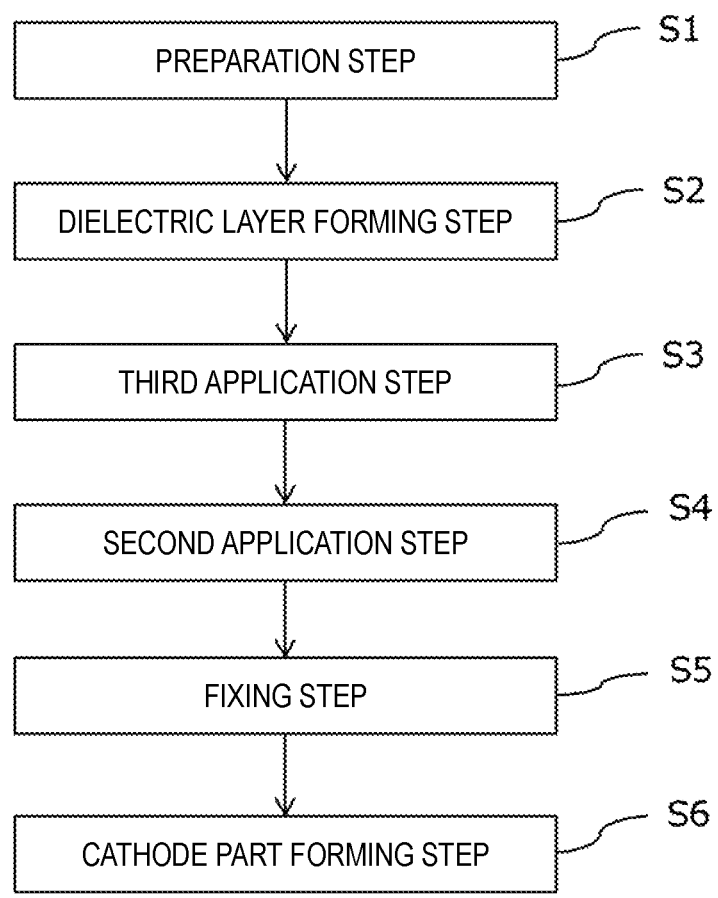
FIG. 15 is a flowchart showing a method for manufacturing an electrolytic capacitor according to an IIb exemplary embodiment of the present invention.

A manufacturing method according to the present exemplary embodiment includes the third application step and the second application step. In this case, the third application step is performed before the second application step. FIG. 15 is a flowchart showing the method for manufacturing an electrolytic capacitor according to the present exemplary embodiment.

In the present exemplary embodiment, preparation step (S1), dielectric layer forming step (S2), third application step (S3), second application step (S4), fixing step (S5), and cathode part forming step (S6) are performed in this order. As a result, the third insulating member is efficiently disposed in pores of the porous region in the anode part, and the second insulating member is disposed to cover the surface of the intermediate part. In the fixing step, the third insulating material and the second insulating material are cured or solidified, so that they are fixed to predetermined positions, respectively.

IIc-th Exemplary Embodiment

Figure 16:
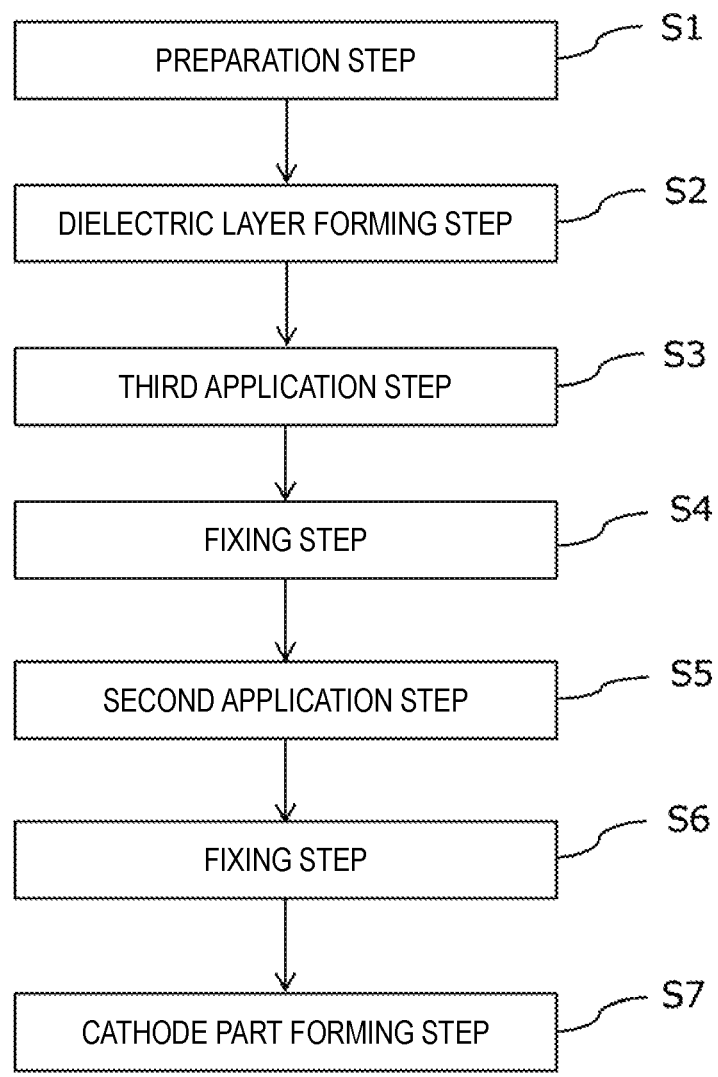
FIG. 16 is a flowchart showing a method for manufacturing an electrolytic capacitor according to an IIc exemplary embodiment of the present invention.

A manufacturing method according to the present exemplary embodiment is the same as that of the IIb-th exemplary embodiment except that fixing step (S4) is performed after third application step (S3). FIG. 16 is a flowchart showing the method for manufacturing an electrolytic capacitor according to the present exemplary embodiment.

In the fixing step immediately after the third application step, the third insulating material is cured or solidified and fixed to a predetermined position. In the fixing step immediately after the second application step, the second insulating material is cured or solidified and fixed to a predetermined position. Also in this case, the third insulating member is efficiently disposed in pores of the porous region in the anode part, and the second insulating member is disposed to cover the surface of the intermediate part.

IId-th Exemplary Embodiment

Figure 17:
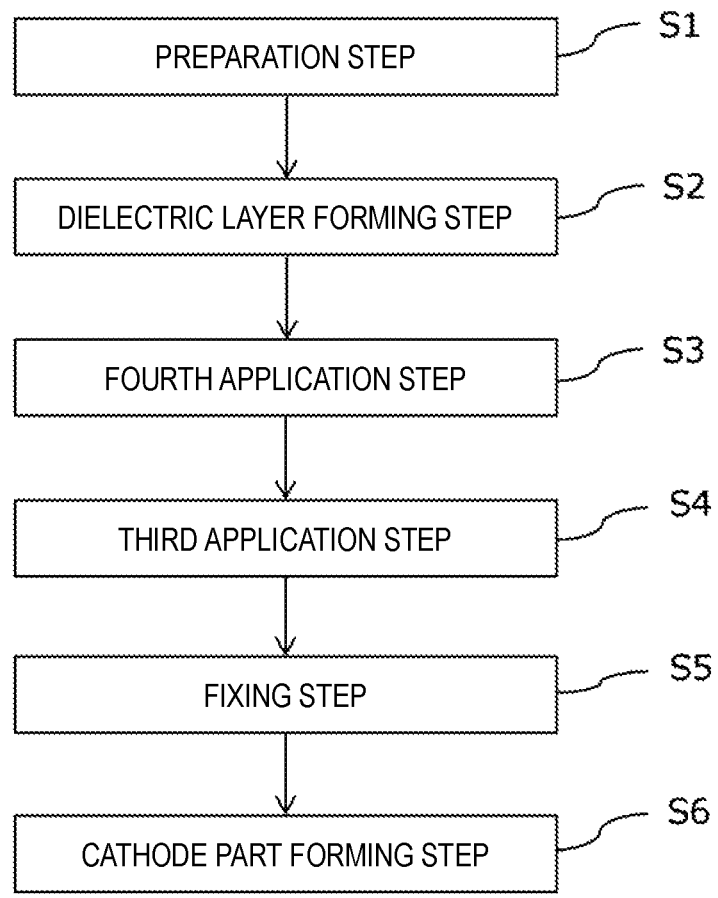
FIG. 17 is a flowchart showing a method for manufacturing an electrolytic capacitor according to an IId exemplary embodiment of the present invention.

A manufacturing method according to the present exemplary embodiment includes the third application step and the fourth application step. FIG. 17 is a flowchart showing the method for manufacturing an electrolytic capacitor according to the present exemplary embodiment.

In the present exemplary embodiment, preparation step (S1), dielectric layer forming step (S2), fourth application step (S3), third application step (S4), fixing step (S5), and cathode part forming step (S6) are performed in this order. As a result, the fourth insulating member is efficiently disposed in pores of the porous region in the intermediate part, and the third insulating member is efficiently disposed in pores of the porous region in the anode part. In the fixing step, the fourth insulating material and the third insulating material are cured or solidified and fixed to predetermined positions, respectively.

Meanwhile, the third application step may be performed before the fourth application step, or may be performed in parallel with the fourth application step.

IIe-th Exemplary Embodiment

Figure 18:
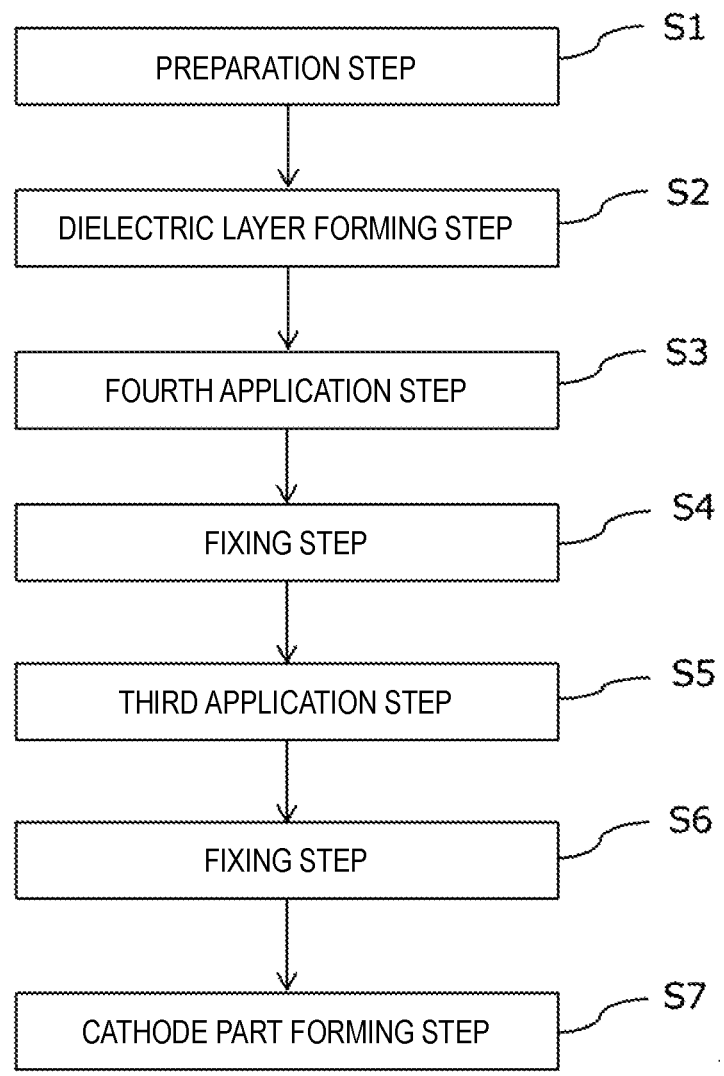
FIG. 18 is a flowchart showing a method for manufacturing an electrolytic capacitor according to an IIe exemplary embodiment of the present invention.

A manufacturing method according to the present exemplary embodiment is the same as that of the IId-th exemplary embodiment except that fixing step (S4) is performed after fourth application step (S3). FIG. 18 is a flowchart showing the method for manufacturing an electrolytic capacitor according to the present exemplary embodiment.

In the fixing step immediately after the fourth application step, the fourth insulating material is cured or solidified and fixed to a predetermined position. In the fixing step immediately after the third application step, the third insulating material is cured or solidified and fixed to a predetermined position. Also in this case, the fourth insulating member is efficiently disposed in pores of the porous region in the intermediate part, and the third insulating member is efficiently disposed in pores of the porous region in the anode part.

IIf-th Exemplary Embodiment

Figure 19:
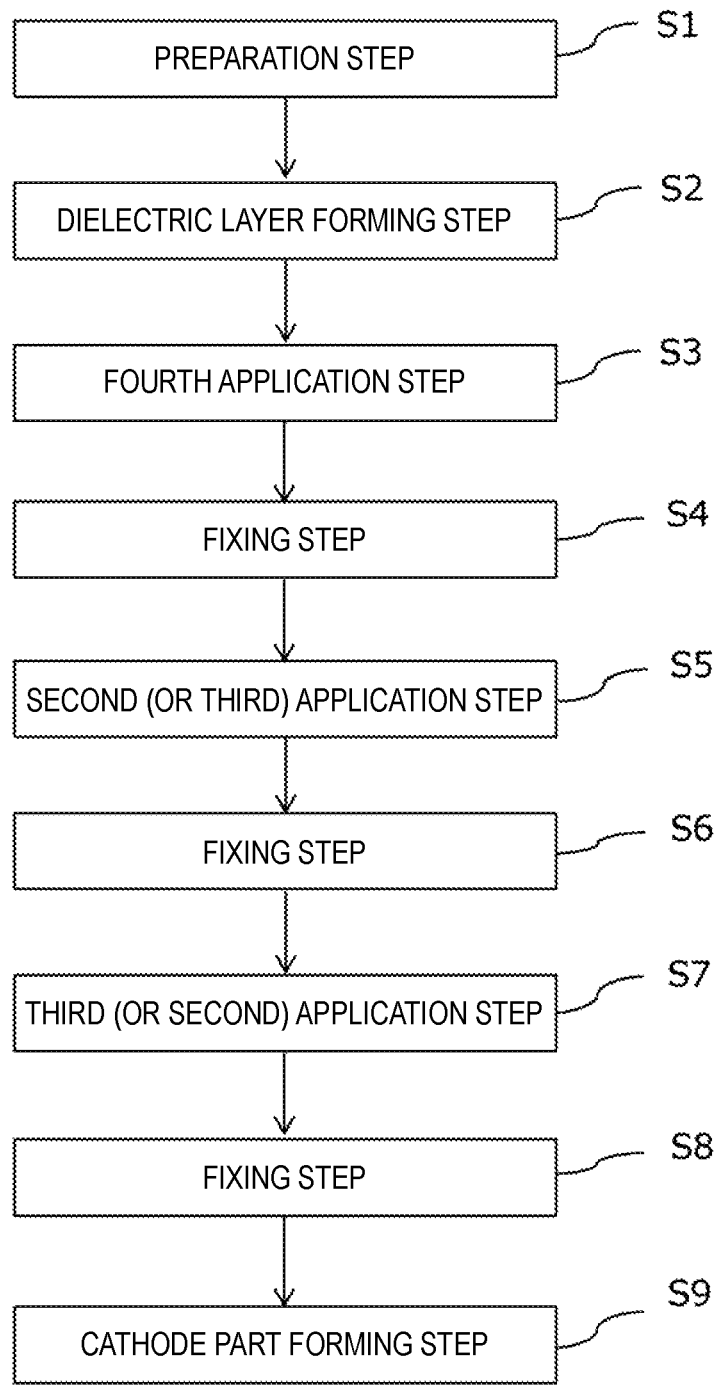
FIG. 19 is a flowchart showing a method for manufacturing an electrolytic capacitor according to an IIf exemplary embodiment of the present invention.

A manufacturing method according to the present exemplary embodiment includes the fourth application step, the second application step, and the third application step. In this case, the fourth application step is performed before the second application step and the third application step. FIG. 19 is a flowchart showing the method for manufacturing an electrolytic capacitor according to the present exemplary embodiment.

In the present exemplary embodiment, preparation step (S1), dielectric layer forming step (S2), fourth application step (S3), fixing step (S4), second (or third) application step (S5), fixing step (S6), third (or second) application step (S7), fixing step (S8), and cathode part forming step (S9) are performed in this order. As a result, the fourth insulating member is efficiently disposed in pores of the porous region in the intermediate part, the second insulating member is disposed to cover the surface of the intermediate part, and the third insulating member is efficiently disposed in pores of the porous region in the anode part.

IIg-th Exemplary Embodiment

Figure 20:
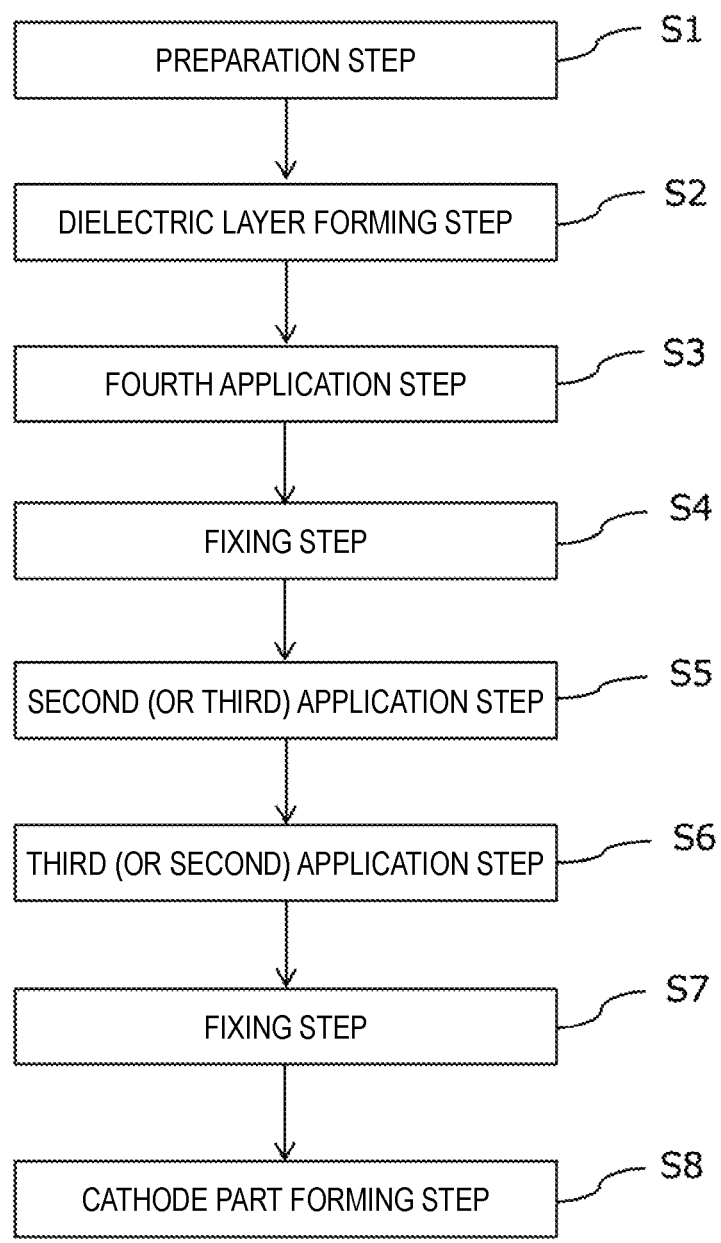
FIG. 20 is a flowchart showing a method for manufacturing an electrolytic capacitor according to an IIg exemplary embodiment of the present invention.

A manufacturing method according to the present exemplary embodiment is the same as that of the IIf-th exemplary embodiment except that the fixing step after second (or third) application step (S5) is omitted. FIG. 20 is a flowchart showing the method for manufacturing an electrolytic capacitor according to the present exemplary embodiment. Also in this case, the fourth insulating member is efficiently disposed in pores of the porous region in the intermediate part, the second insulating member is disposed to cover the surface of the intermediate part, and the third insulating member is efficiently disposed in pores of the porous region in the anode part.

IIh-th Exemplary Embodiment

Figure 21:
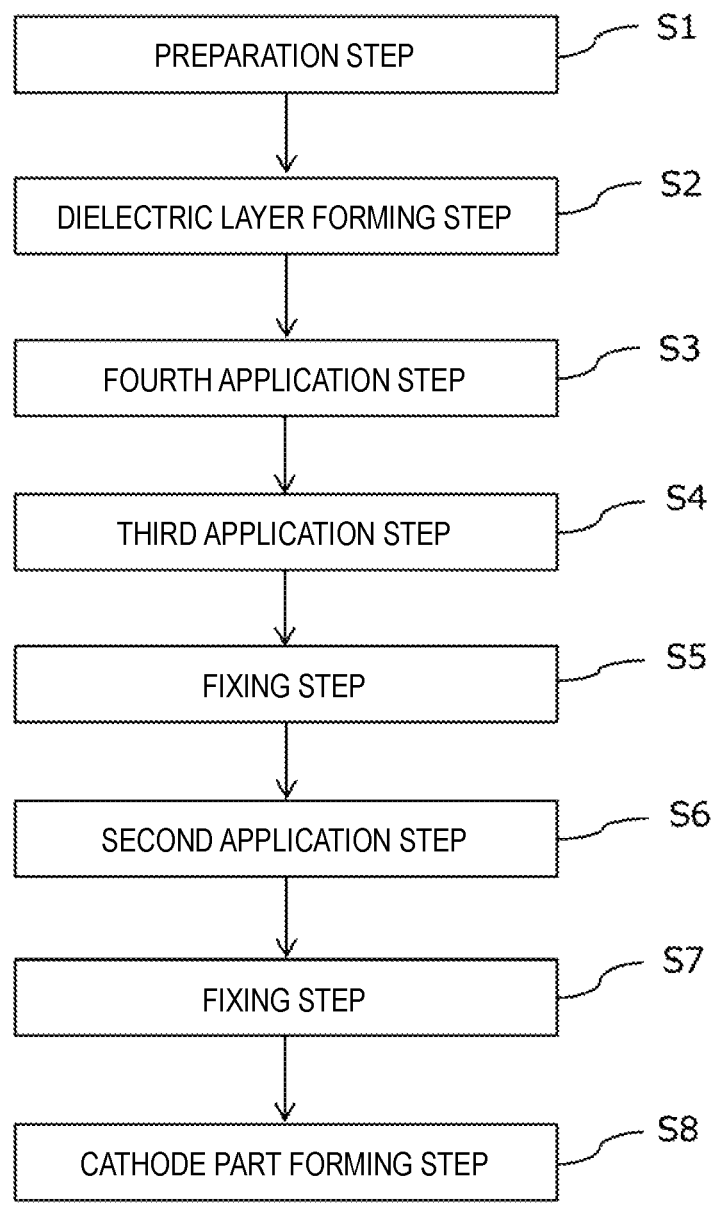
FIG. 21 is a flowchart showing a method for manufacturing an electrolytic capacitor according to an IIh exemplary embodiment of the present invention.

A manufacturing method according to the present exemplary embodiment is the same as that of the IIf-th exemplary embodiment except that the fixing step after fourth application step (S3) is omitted and subsequently the third application step is performed. FIG. 21 is a flowchart showing the method for manufacturing an electrolytic capacitor according to the present exemplary embodiment. Also in this case, the fourth insulating member is efficiently disposed in pores of the porous region in the intermediate part, the second insulating member is disposed to cover the surface of the intermediate part, and the third insulating member is efficiently disposed in pores of the porous region in the anode part.

(First Insulating Material)

The first insulating material contains the first reactive compound described above.

It is preferable that the viscosity of the first insulating material is not excessively high. The viscosity of the first insulating material measured at 25° C. using a dynamic viscoelasticity measuring device is preferably less than or equal to 6000 mPa·s, and preferably less than or equal to 5500 mPa·s. When the viscosity of the first insulating material is in this range, the first insulating material easily permeates the porous region. The viscosity of the first insulating material is preferably more than or equal to 5 mPa·s, and preferably more than or equal to 50 mPa·s. The viscosity is measured, for example, using a viscoelasticity measuring device under the conditions of a measurement temperature of 25° C. and a measurement time of 180 seconds (the same applies hereinafter).

From the viewpoint of enhancing the oxygen blocking effect, it is preferable that the proportion of the first reactive compound contained in the first insulating material is large. The proportion of the first reactive compound contained in the first insulating material is preferably more than or equal to 80 mass %, and preferably more than or equal to 90 mass %. It is particularly preferable that the first insulating material does not contain a liquid component that dissolves or disperses the first reactive compound. The proportion of the liquid component contained in the first insulating material is preferably less than 10 mass %, and more preferably less than 5 mass %. The liquid component is not particularly limited, and is appropriately selected according to the type of the first reactive compound. Examples of the liquid component contained in the first insulating material include the same compounds as a first liquid component to be described later.

(Second Insulating Material)

The second insulating material contains a second resin component. The second resin component contains the reactive compound described above or the first non-reactive resin. The second resin component preferably contains the first non-reactive resin.

It is preferable that the viscosity of the second insulating material is not excessively low. The viscosity of the second insulating material measured at 25° C. using a dynamic viscoelasticity measuring device is preferably more than or equal to 10 Pa·s, and preferably more than or equal to 15 Pa·s. When the viscosity of the second insulating material is in this range, the second insulating material is easily disposed on the surface of the intermediate region. The viscosity of the second insulating material is preferably less than or equal to 100 Pa·s, and preferably less than or equal to 50 Pa·s.

From the viewpoint of facilitating application of the second insulating material in a film shape, it is preferable that the second insulating material contains, together with the second resin component, a liquid component (first liquid component) that dissolves or disperses the second resin component. The proportion of the first liquid component contained in the second insulating material is preferably more than or equal to 50 mass %, and more preferably more than or equal to 60 mass %. The proportion of the first liquid component is preferably less than or equal to 90 mass %, and more preferably less than or equal to 80 mass %. Specifically, the proportion of the first liquid component preferably ranges from 50 mass % to 90 mass %, inclusive.

The first liquid component is not particularly limited, and is appropriately selected according to the type of the second resin component. The first liquid component may be water, a non-aqueous solvent, or a mixture thereof. The non-aqueous solvent is a generic term for liquids excluding water, and examples thereof include organic solvents and ionic liquids. Examples of the non-aqueous solvent include: alcohols such as methanol, ethanol, propanol, butanol, ethylene glycol (EG), propylene glycol, polyethylene glycol (PEG), diethylene glycol monobutyl ether, glycerin, polyglycerin, sorbitol, mannitol, and pentaerythritol; formaldehyde; amides such as N-methylacetamide, N,N-dimethylformamide, and N-methyl-2-pyrrolidone; esters such as methyl acetate and γ-butyrolactone (γBL); ketones such as methyl ethyl ketone; ethers such as 1,4-dioxane; sulfur-containing compounds such as dimethyl sulfoxide and sulfolane (SL); and carbonate compounds such as propylene carbonate. These may be used alone or in combination of two or more types. Among them, γBL is preferable from the viewpoint of low hygroscopicity.

(Third Insulating Material)

The third insulating material contains a third resin component. The third resin component contains the third reactive compound or the second non-reactive resin that have been described above.

It is preferable that a viscosity of the third insulating material is not excessively high. The viscosity of the third insulating material measured at 25° C. using a dynamic viscoelasticity measuring device is preferably less than or equal to 6000 mPa·s, and preferably less than or equal to 5500 mPa·s. When the viscosity of the third insulating material is in this range, the third insulating material easily permeates the porous region. The viscosity of the third insulating material is preferably more than or equal to 5 mPa·s, and preferably more than or equal to 50 mPa·s.

From the viewpoint of enhancing the oxygen blocking effect, it is preferable that a proportion of the third resin component contained in the third insulating material is large. The proportion of the third resin component contained in the third insulating material is preferably more than or equal to 80 mass %, and preferably more than or equal to 90 mass %. It is particularly preferable that the third insulating material does not contain a liquid component that dissolves or disperses the third resin component. The proportion of the liquid component contained in the third insulating material is preferably less than 10 mass %, and more preferably less than 5 mass %. The liquid component is not particularly limited, and is appropriately selected according to the type of the third resin component. Examples of the liquid component contained in the third insulating material include the same compounds as the first liquid component described above.

(Fourth Insulating Material)

The fourth insulating material contains the fourth resin component. The fourth resin component contains the fourth reactive compound or the third non-reactive resin that have been described above.

It is preferable that a viscosity of the fourth insulating material is not excessively high. The viscosity of the fourth insulating material measured at 25° C. using a dynamic viscoelasticity measuring device is preferably less than or equal to 6000 mPa·s, and preferably less than or equal to 5500 mPa·s. When the viscosity of the fourth insulating material is in this range, the fourth insulating material easily permeates the porous region. The viscosity of the fourth insulating material is preferably more than or equal to 5 mPa·s, and preferably more than or equal to 50 mPa·s.

From the viewpoint of enhancing the oxygen blocking effect, it is preferable that a proportion of the fourth resin component contained in the fourth insulating material is large. The proportion of the fourth resin component contained in the fourth insulating material is preferably more than or equal to 80 mass %, and preferably more than or equal to 90 mass %. It is particularly preferable that the fourth insulating material does not contain a liquid component that dissolves or disperses the fourth resin component. The proportion of the liquid component contained in the fourth insulating material is preferably less than 10 mass %, and more preferably less than 5 mass %. The liquid component is not particularly limited, and is appropriately selected according to the type of the fourth resin component. Examples of the liquid component contained in the fourth insulating material include the same compounds as the first liquid component described above.

EXAMPLES

Hereinafter, the present invention will be specifically described based on examples and a comparative example, but the present invention is not limited to the following examples.

Example 1

(a) Preparation of Anode Body

An aluminum foil having a thickness of 115 μm was subjected to an electrolytic etching treatment to prepare an anode body having porous regions on both principal surface sides. A thickness of the porous region disposed on one principal surface side of the anode body was about 40 μm.

(b) Formation of Dielectric Layer

The anode body was subjected to an anodizing treatment to form a dielectric layer covering both principal surfaces of the anode body.

(c) Application and Fixing of First Insulating Material (Fourth Insulating Material)

A first insulating material (it is also a fourth insulating material: the same applies hereinafter) containing an unsaturated polyester (reactive compound) was prepared. A proportion of the unsaturated polyester in the first insulating material was 100 mass %. A viscosity of the first insulating material at 25° C. was 5000 mPa·s. The above viscosity was measured using a viscoelasticity measuring device (DHR-2 manufactured by TA Instruments) under the conditions of an Oscillation mode, a measurement temperature of 25° C., and a measurement time of 180 seconds (hereinafter, the same applies).

The first insulating material was linearly applied to a predetermined intermediate region of the anode body using a dispenser. Subsequently, a heat treatment (temperature 170° C., 10 min) was performed to cure the unsaturated polyester, so that the first insulating material was fixed. As a result, the first insulating member was disposed in pores of the porous region in an intermediate region. The mass of the first insulating member was about 18 mg/cm². An oxygen transmittance of the first insulating member was $5.6 \times 10^{-11}$ cc·cm/(cm²·sec·cmHg). An electric resistance value of the first insulating member was $1.0 \times 10^{12}$ Ω·m. A tensile elastic modulus of the first insulating member was 4.0 GPa. A tensile strength of the first insulating member was 82 MPa. The first insulating member was disposed in the entire porous region in the intermediate region (occupancy: about 100%).

(d1) Application and Fixing of Second Insulating Material

A second insulating material containing polyamideimide (non-reactive resin) and γBL (first liquid component) was prepared. A proportion of the polyamideimide in the second insulating material was 38 mass %. A viscosity of the second insulating material at 25° C. was 35 Pa·s.

After the first insulating material was fixed, the second insulating material was linearly applied to a predetermined intermediate region of the anode body using a dispenser. Subsequently, a heat treatment (temperature 215° C., 10 min) was performed to fix the polyamideimide. As a result, the second insulating member was disposed to cover the intermediate region. The mass of the second insulating member was about 30 mg/cm². An oxygen transmittance of the second insulating member was $1.1 \times 10^{-11}$ cc·cm/(cm²·sec·cmHg). An electric resistance value of the second insulating member was $5.0 \times 10^{12}$ Ω·m. A tensile elastic modulus of the second insulating member was 4.5 GPa. A tensile strength of the second insulating member was 150 MPa. The second insulating member was disposed on the entire surface of the intermediate region (occupancy: about 100%).

(e) Formation of Solid Electrolyte Layer

An aniline aqueous solution containing aniline and sulfuric acid was prepared.

A tape-shaped electrode was attached onto the formed second insulating member. Subsequently, a predetermined cathode region of the anode body and a counter electrode were immersed in the aniline aqueous solution, and electrolytic polymerization was performed at a current density of 10 mA/cm² for 20 minutes. As a result, a solid electrolyte layer was formed in the cathode region.

(f) Formation of Cathode Lead-Out Layer

Carbon paste and silver paste were sequentially applied onto the solid electrolyte layer and dried. As a result, a cathode lead-out layer was formed to obtain a capacitor element.

In the obtained capacitor element, a ratio of the length of the intermediate part to the length of a cathode part was about 0.0556.

[Evaluation of Heat Resistance Reliability]

For the obtained capacitor element, electrostatic capacities before and after a heat treatment were measured, and a rate of change thereof was calculated. Table 1 shows a result. The heating was performed at 145° C. for 250 hours. The rate of change was determined from {(electrostatic capacity before heat treatment−electrostatic capacity after heat treatment)/electrostatic capacity before heat treatment}.

Example 2

A capacitor element was produced in the same way as in Example 1 except that, in place of the application and fixing of the second insulating material (d1), a third insulating material was applied and fixed as follows after the application and fixing of the first insulating material (c). Then, the capacitor element was evaluated. Table 1 shows a result.

(d2) Application and Fixing of Third Insulating Material

A third insulating material containing polyamideimide (non-reactive resin) and γBL (second liquid component) was prepared. A proportion of the polyamideimide in the third insulating material was 29 mass %. A viscosity of the third insulating material at 25° C. was 3600 mPa·s.

After the first insulating material was fixed, the third insulating material was linearly applied to the anode region using a dispenser. Subsequently, a heat treatment (temperature 215° C., 10 min) was performed to fix the polyamideimide. As a result, the third insulating member was disposed in pores of the porous region in the anode region. The mass of the third insulating member was about 24 mg/cm$^2$. An oxygen transmittance of the third insulating member was $2.1 \times 10^{-11}$ cc·cm/(cm$^2$·sec·cmHg). An electric resistance value of the third insulating member was $6.0 \times 10^{12}$ Ω·m. A tensile elastic modulus of the third insulating member was 3.9 GPa. A tensile strength of the third insulating member was 78 MPa. The third insulating member was disposed in the entire anode region (occupancy: about 100%).

Example 3

A capacitor element was produced in the same way as in Example 1 except that, in place of the application and fixing of the second insulating material (d1), a third insulating material was applied and fixed as follows after the application and fixing of the first insulating material (c). Then, the capacitor element was evaluated. Table 1 shows a result.

(d3) Application and Fixing of Third Insulating Material

A third insulating material containing unsaturated polyester (reactive compound) was prepared. A proportion of the unsaturated polyester in the third insulating material was 100 mass %. A viscosity of the third insulating material at 25° C. was 100 mPa·s.

After the first insulating material was fixed, the third insulating material was linearly applied to a predetermined anode region of the anode body using a dispenser. Subsequently, a heat treatment (temperature 170° C., 10 min) was performed to cure the unsaturated polyester, so that the third insulating material was fixed. As a result, the third insulating member was disposed in pores of the porous region in the anode region. The mass of the third insulating member was about 19 mg/cm$^2$. An oxygen transmittance of the third insulating member was $4.9 \times 10^{-11}$ cc·cm/(cm$^2$·sec·cmHg). An electric resistance value of the third insulating member was $4.8 \times 10^{12}$ Ω·m. A tensile elastic modulus of the third insulating member was 4.0 GPa. A tensile strength of the third insulating member was 80 MPa. The third insulating member was disposed in the entire anode region (occupancy: about 100%).

Comparative Example 1

A capacitor element was produced in the same way as in Example 1 except that, in place of the application and fixing of the first insulating material (c) and the application and fixing of the second insulating material (d1), an insulating material containing polyamideimide and γBL (mass proportion of polyamideimide: 37.5%) was applied and fixed in pores of the porous region in the intermediate region. Then, the capacitor element was evaluated. Table 1 shows a result. The mass of the fixed insulating member was about 8 mg/cm$^2$.

TABLE 1

| | Rate of change of electrostatic capacity |
|---|---|
| Example 1 | 38% |
| Example 2 | 31% |
| Example 3 | 29% |
| Comparative Example 1 | 85% |

Since the electrolytic capacitor of the present invention is excellent in heat resistance reliability, it can be used in various applications.

22 second insulating member
23 third insulating member
24 fourth insulating member
120A anode lead terminal
120B cathode lead terminal
130 sealing resin

The invention claimed is:

1. An electrolytic capacitor comprising a capacitor element, the capacitor element including an anode part, a cathode part, and an intermediate part interposed between the anode part and the cathode part, wherein:
the anode part includes a first portion that is a part of an anode body having a porous region, and a first dielectric layer covering at least a part of the first portion,
the intermediate part includes a second portion other than the first portion of the anode body, a second dielectric layer covering at least a part of the second portion, and a first insulating member containing a first resin component,
the cathode part includes a third portion other than the first portion and the second portion of the anode body, a third dielectric layer covering at least a part of the third portion, a solid electrolyte layer covering at least a part of the third dielectric layer, and a cathode lead-out layer covering at least a part of the solid electrolyte layer,
the first resin component contains a curing product of a first reactive compound,
at least a part of the first insulating member is disposed in pores of the porous region in the intermediate part,
the intermediate part further includes a second insulating member containing a second resin component,
the second insulating member covers only a part of the capacitor element and does not cover a remaining part of the capacitor element,
the part of the capacitor element includes a surface of the intermediate part,
the first insulating member and the second insulating member are located at a boundary between the cathode part and the intermediate part,
the second resin component contains a first non-reactive resin which is a thermoplastic resin, and
the first non-reactive resin contains at least one engineering plastic selected from the group consisting of a general-purpose engineering plastic and a super engineering plastic.

2. The electrolytic capacitor according to claim 1, wherein:
the anode part includes a third insulating member containing a third resin component, and at least a part of the third insulating member is disposed in pores of the porous region in the anode part.

3. The electrolytic capacitor according to claim 2, wherein the third resin component contains a second non-reactive resin.

4. The electrolytic capacitor according to claim 2, wherein the third resin component contains a curing product of a third reactive compound.

5. The electrolytic capacitor according to claim 2, wherein a viscosity of a raw material of the third insulating member is less than or equal to 6000 mPa·s where the viscosity is measured at 25° C. using a dynamic viscoelasticity measuring device.

6. The electrolytic capacitor according to claim 1, wherein the second resin component contains a first non-reactive resin.

7. The electrolytic capacitor according to claim 1, wherein the second resin component contains a curing product of a second reactive compound.

8. The electrolytic capacitor according to claim 1, wherein a viscosity of a raw material of the first insulating member is less than or equal to 6000 mPa·s where the viscosity is measured at 25° C. using a dynamic viscoelasticity measuring device.

9. The electrolytic capacitor according to claim 1, wherein a viscosity of a raw material of the second insulating member is more than or equal to 10 Pa·s where the viscosity is measured at 25° C. using a dynamic viscoelasticity measuring device.

10. The electrolytic capacitor according to claim 1, wherein in a direction connecting the anode part, the intermediate part, and the cathode part, a ratio of a length of the intermediate part to a length of the cathode part ranges from 0.001 to 0.2, inclusive.

11. The electrolytic capacitor according to claim 1, wherein the second resin component contains at least one selected from the group consisting of polyester, polyamide, polycarbonate, polyacetal, polyphenylene ether, polyphenylene sulfide, polyether ether ketone, polyacrylic ether ketone, polyamide imide, polyimide, polyether imide, polysulfone, polyether sulfone, and fluororesin.

12. The electrolytic capacitor according to claim 1, wherein the first reactive compound contains an unsaturated polyester.

13. An electrolytic capacitor comprising a capacitor element, the capacitor element including an anode part, a cathode part, and an intermediate part interposed between the anode part and the cathode part, wherein:
the anode part includes a first portion that is a part of an anode body having a porous region, a first dielectric layer covering at least a part of the first portion, and a third insulating member containing a third resin component,
the intermediate part includes a second portion other than the first portion of the anode body, a second dielectric layer covering at least a part of the second portion, and a first insulating member containing a first resin component,
the cathode part includes a third portion other than the first portion and the second portion of the anode body, a third dielectric layer covering at least a part of the third portion, a solid electrolyte layer covering at least a part of the third dielectric layer, and a cathode lead-out layer covering at least a part of the solid electrolyte layer,
at least a part of the first insulating member is disposed in pores of the porous region in the intermediate part,
at least a part of the third insulating member is disposed in pores of the porous region in the anode part,
the intermediate part further includes a second insulating member containing a second resin component,
the second insulating member covers only a part of the capacitor element and does not cover a remaining part of the capacitor element,
the part of the capacitor element includes a surface of the intermediate part,
the first insulating member and the second insulating member are located at a boundary between the cathode part and the intermediate part,
the second resin component contains a first non-reactive resin which is a thermoplastic resin, and
the first non-reactive resin contains at least one engineering plastic selected from the group consisting of a general-purpose engineering plastic and a super engineering plastic.

14. The electrolytic capacitor according to claim 13, wherein the second resin component contains at least one selected from the group consisting of polyester, polyamide, polycarbonate, polyacetal, polyphenylene ether, polyphenylene sulfide, polyether ether ketone, polyacrylic ether ketone, polyamide imide, polyimide, polyether imide, polysulfone, polyether sulfone, and fluororesin.

15. The electrolytic capacitor according to claim 13, wherein the first reactive compound contains an unsaturated polyester.

16. A method for manufacturing an electrolytic capacitor, the electrolytic capacitor including a capacitor element including an anode part, a cathode part, and an intermediate part interposed between the anode part and the cathode part, the method comprising:
a preparation step of preparing an anode body having a porous region;
a dielectric layer forming step of forming a dielectric layer on at least a part of a surface of the anode body;
a first application step of defining an anode region corresponding to the anode part, a cathode region corresponding to the cathode part, and an intermediate region corresponding to the intermediate part and being interposed between the anode region and the cathode region in the anode body, and then applying a first insulating material containing a first resin component to the intermediate region so that at least a part of the first insulating material is disposed in pores of the porous region in the intermediate region;
a second applying step of, after the first application step, applying a second insulating material containing a second resin component to the intermediate region so that the second insulating material covers only a part of the capacitor element and does not cover a remaining part of the capacitor element, the part of the capacitor element including a surface of the intermediate region;
a curing step of curing a first reactive compound contained in the first resin component; and
a cathode part forming step of forming a solid electrolyte layer and a cathode lead-out layer covering at least a part of the solid electrolyte layer, the solid electrolyte layer covering at least a part of the dielectric layer in the cathode region, wherein:
the first insulating material and the second insulating material are located at a boundary between the cathode region and the intermediate region,
the second resin component contains a first non-reactive resin which is a thermoplastic resin, and the first non-reactive resin contains at least one engineering plastic selected from the group consisting of a general-purpose engineering plastic and a super engineering plastic.

17. The method according to claim 16, the method further comprising a third application step of applying a third insulating material containing a third resin component to the anode region so that at least a part of the third insulating material is disposed in pores of the porous region in the anode region.

18. The method according to claim 17, wherein a viscosity of the third insulating material is less than or equal to 6000 mPa·s where the viscosity is measured at 25° C. using a dynamic viscoelasticity measuring device.

19. The method according to claim 17, wherein a proportion of the third resin component in the third insulating material is more than or equal to 80 mass %.

20. The method according to claim 16, wherein a viscosity of the first insulating material is less than or equal to 6000 mPa·s where the viscosity is measured at 25° C. using a dynamic viscoelasticity measuring device.

21. The method according to claim 16, wherein a proportion of the first reactive compound in the first insulating material is more than or equal to 80 mass %.

22. The method according to claim 16, wherein a viscosity of the second insulating material is more than or equal to 10 Pa·s where the viscosity is measured at 25° C. using a dynamic viscoelasticity measuring device.

23. The method according to claim 16, wherein:
the second insulating material contains the second resin component and a liquid component that dissolves or disperses the second resin component, and
a proportion of the liquid component in the second insulating material ranges from 10 mass % to 50 mass %, inclusive.

24. The method according to claim 16, wherein the second resin component contains at least one selected from the group consisting of polyester, polyamide, polycarbonate, polyacetal, polyphenylene ether, polyphenylene sulfide, polyether ether ketone, polyacrylic ether ketone, polyamide imide, polyimide, polyether imide, polysulfone, polyether sulfone, and fluororesin.

25. The method according to claim 16, wherein the first reactive compound contains an unsaturated polyester.

26. A method for manufacturing an electrolytic capacitor, the electrolytic capacitor including a capacitor element including an anode part, a cathode part, and an intermediate part interposed between the anode part and the cathode part, the method comprising:
a preparation step of preparing an anode body having a porous region;
a dielectric layer forming step of forming a dielectric layer on at least a part of a surface of the anode body;
a first application step of defining an anode region corresponding to the anode part, a cathode region corresponding to the cathode part, and an intermediate region corresponding to the intermediate part and being interposed between the anode region and the cathode region in the anode body, and then applying a first insulating material containing a first resin component to the intermediate region so that at least a part of the first insulating material is disposed in pores of the porous region in the intermediate region;
a second applying step of, after the first application step, applying a second insulating material containing a second resin component to the intermediate region so that the second insulating material covers only a part of the capacitor element and does not cover a remaining part of the capacitor element, the part of the capacitor element including a surface of the intermediate region;
a third application step of applying a third insulating material containing a third resin component to the anode region so that at least a part of the third insulating material is disposed in pores of the porous region in the anode region;
a fixing step of fixing the third resin component; and
a cathode part forming step of forming a solid electrolyte layer and a cathode lead-out layer covering at least a part of the solid electrolyte layer, the solid electrolyte layer covering at least a part of the dielectric layer in the cathode region, wherein
the first insulating material and the second insulating material are located at a boundary between the cathode region and the intermediate region.

\* \* \* \* \*